(12) United States Patent
Ozawa et al.

(10) Patent No.: US 10,007,470 B2
(45) Date of Patent: Jun. 26, 2018

(54) PRINTING SYSTEM AND PRINTING PROGRAM, WHICH EFFICIENTLY ACHIEVE HEALTH PROMOTION OF A USER, AND SECURE SECURITY

(71) Applicant: Konica Minolta, Inc., Chiyoda-ku, Tokyo (JP)

(72) Inventors: Tomohiro Ozawa, Tama (JP); Katsutoshi Sawada, Hino (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days. days.

(21) Appl. No.: 15/490,150

(22) Filed: Apr. 18, 2017

(65) Prior Publication Data

US 2017/0329562 A1    Nov. 16, 2017

(30) Foreign Application Priority Data

May 13, 2016   (JP) .................. 2016-097357

(51) Int. Cl.
   *G06F 3/12*   (2006.01)
   *H04N 1/00*   (2006.01)
(52) U.S. Cl.
   CPC .......... *G06F 3/1236* (2013.01); *G06F 3/1203* (2013.01); *G06F 3/1222* (2013.01);
   (Continued)
(58) Field of Classification Search
   None
   See application file for complete search history.

(56) References Cited

U.S. PATENT DOCUMENTS

2007/0127058 A1*  6/2007  Eldridge ............... G06F 3/1222
                                           358/1.15
2007/0136087 A1*  6/2007  Yamaguchi ........... G06F 21/608
                                           358/1.15
(Continued)

FOREIGN PATENT DOCUMENTS

JP    2013-062313 A    4/2013
JP    2013-235446 A    11/2013
JP    2014-088244 A    5/2014

*Primary Examiner* — Henok A Shiferaw
(74) *Attorney, Agent, or Firm* — Buchanan Ingersoll & Rooney PC

(57) ABSTRACT

Provided is a server that manages a printing system including candidate printing apparatuses, the printing system including a request user detection unit configured to detect that a request user of a printing job enters a range of an authentication distance, and the printing system causing a hardware processor of the server to execute: selecting a route that connects applied printing apparatuses and determining allocation of the printing job; notifying the request user of information of the route; and notifying the applied printing apparatuses of request information, wherein, in the determination, the allocation is determined on the basis of predetermined time at which the request user arrives when the request user moves along the route and sequentially acquires printed matters, and the applied printing apparatuses initiate output of the printed matters, and wherein the authentication distance corresponds to required time taken from initiation to completion of output of the printed matters.

32 Claims, 24 Drawing Sheets

(52) U.S. Cl.
CPC .......... *G06F 3/1238* (2013.01); *G06F 3/1286* (2013.01); *H04N 1/00244* (2013.01); *H04N 2201/0094* (2013.01)

(56) References Cited

U.S. PATENT DOCUMENTS

| | | | |
|---|---|---|---|
| 2008/0170256 A1* | 7/2008 | Matsuhara | G06F 3/1207 358/1.15 |
| 2008/0259399 A1* | 10/2008 | Wada | G06F 3/1204 358/1.15 |
| 2011/0261405 A1* | 10/2011 | Ito | G06F 1/3203 358/1.15 |
| 2012/0212778 A1* | 8/2012 | Sakai | G06K 15/402 358/1.15 |
| 2013/0003125 A1* | 1/2013 | Morii | G06K 15/1817 358/1.15 |
| 2016/0182762 A1* | 6/2016 | Eum | H04N 1/4413 358/1.14 |
| 2016/0219189 A1* | 7/2016 | Kitazaki | H04N 1/442 |
| 2016/0286085 A1* | 9/2016 | Wagatsuma | H04N 1/4413 |
| 2017/0123737 A1* | 5/2017 | Januszewski | G06F 3/126 |

* cited by examiner

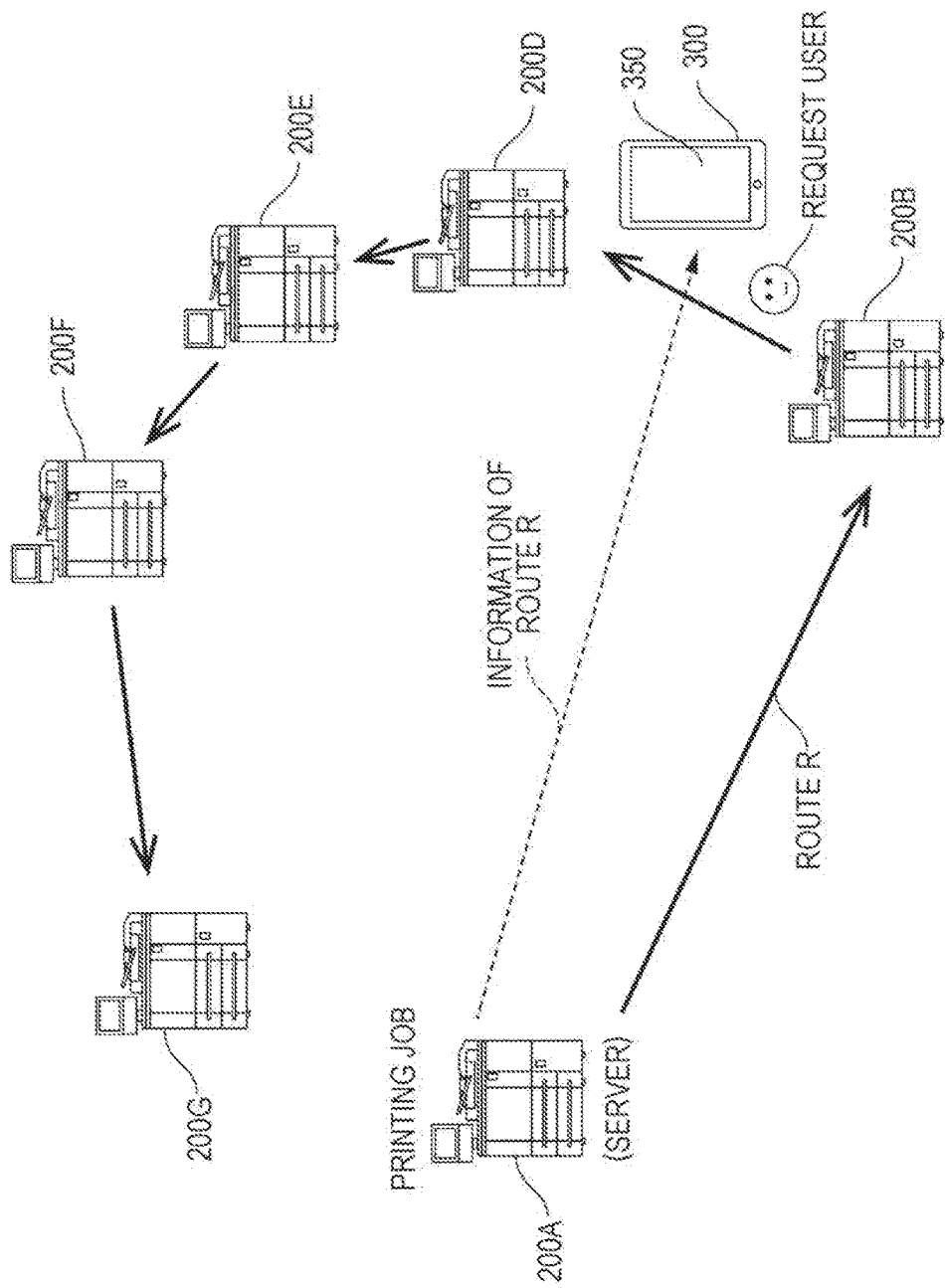

PRINTING SYSTEM AND PRINTING PROGRAM, WHICH EFFICIENTLY ACHIEVE HEALTH PROMOTION OF A USER, AND SECURE SECURITY

The entire disclosure of Japanese Patent Application No. 2016-097357 filed on May 13, 2016 including description, claims, drawings, and abstract are incorporated herein by reference in its entirety.

BACKGROUND OF THE INVENTION

Field of the Invention

The present invention relates to a printing system and a printing program.

Description of the Related Art

In recent years, the Ministry of Economy, Trade, and Industry selects enterprises which make efforts on health promotion as health & productivity stock selection, and a health trend also increases in offices. Accordingly, a lot of enterprises attempt to introduce a movement for health promotion in work. For example, various attempts are made by enterprises, and examples of the attempts are as follows. A pedometer (registered trademark) is distributed to employees so as to initiatively urge the employees to walk, or a radio gymnastic exercise is performed in business hours. However, actually, employees hardly move and hardly walk in some cases.

Accordingly, there is suggested a system that urges a user who is an employee to walk and supports an increase in the number of walking steps by using a multi-function peripheral (MFP) that exists in an office (for example, refer to JP 2014-88244 A).

However, in a case where a user walks along a course that is set and accomplishes a target number of walking steps, the MFP outputs an image along the course and changes an image that can be output in correspondence with the accomplished number of walking steps. According to this, the MFP enhances motivation for an increase in the number of walking steps of the user. That is, the user is not urged to walk, and there is no consideration on quality of a walking method of the user. Therefore, there is a problem that health promotion (increase in the number of walking steps) of the user is not efficient.

SUMMARY OF THE INVENTION

The invention has been made to solve the problem in the related art, and an object thereof is to provide a printing system and a printing program which efficiently achieve health promotion (increase in the number of walking steps) of a user, and secure security.

The object of the invention is achieved by the following means.

(1) To achieve the abovementioned object, according to an aspect, a server reflecting one aspect of the present invention manages a printing system including a plurality of candidate printing apparatuses connected to a network, the printing system including a request user detection unit configured to detect that a request user of a printing job, which is subjected to distribution processing, enters a range of an authentication distance according to the plurality of candidate printing apparatuses, and the printing system causing a hardware processor of the server to execute:

a determination procedure of selecting a route that connects a plurality of applied printing apparatuses which are extracted from the plurality of candidate printing apparatuses on the basis of a walking distance and a walking speed which are set to the request user in advance, position information including distance data, which is stored in a memory in advance, between the plurality of candidate printing apparatuses, the authentication distance, and specifications including a printing speed in the plurality of candidate printing apparatus, and of determining allocation of the printing job that is executed in the plurality of applied printing apparatuses;

a route notification procedure of notifying the request user of information of the route; and a request information notification procedure of notifying the plurality of applied printing apparatuses of request information including the allocation, wherein, in the determination procedure, the allocation is determined on the basis of predetermined time at which the request user arrives so that when the request user moves along the route and sequentially acquires printed matters corresponding to the allocation, user waiting time until completion of output of the printed matters does not occur in each of the applied printing apparatus at which the request user arrives, and the plurality of applied printing apparatuses initiate output of the printed matters corresponding to the allocation in a case where it is detected that the request user enters a range of the authentication distance, and wherein the authentication distance corresponds to required time taken from initiation to completion of output of the printed matters corresponding to the allocation.

(2) To achieve the abovementioned object, according to an aspect, a non-transitory recording medium storing a computer readable printing program reflecting one aspect of the present invention is executed by a server that manages a printing system including a plurality of candidate printing apparatuses connected to a network, the printing system including a request user detection unit configured to detect that a request user of a printing job, which is subjected to distribution processing, enters a range of an authentication distance according to the plurality of candidate printing apparatuses, and the printing program causing a hardware processor of the server to execute:

a determination procedure of selecting a route that connects a plurality of applied printing apparatuses which are extracted from the plurality of candidate printing apparatuses on the basis of a walking distance and a walking speed which are set to the request user in advance, position information including distance data, which is stored in a memory in advance, between the plurality of candidate printing apparatuses, the authentication distance, and specifications including a printing speed in the plurality of candidate printing apparatus, and of determining allocation of the printing job that is executed in the plurality of applied printing apparatuses;

a route notification procedure of notifying the request user of information of the route; and a request information notification procedure of notifying the plurality of applied printing apparatuses of request information including the allocation, wherein, in the determination procedure, the allocation is determined on the basis of predetermined time at which the request user arrives so that when the request user moves along the route and sequentially acquires printed matters corresponding to the allocation, user waiting time until completion of output of the printed matters does not occur in each of the applied printing apparatus at which the request user arrives, and the plurality of applied printing apparatuses are configured to initiate output of the printed matters corresponding to the allocation in a case where it is detected that the request user enters a range of the authentication distance, and wherein the authentication distance corresponds to required time taken from initiation to completion of output of the printed matters corresponding to the allocation.

(3) To achieve the abovementioned object, according to an aspect, a printing system reflecting one aspect of the present invention comprises:

a plurality of candidate printing apparatuses connected to a network;

a memory configured to store position information including distance data between the plurality of candidate printing apparatuses;

a request user detection unit configured to detects that a request user of a printing job, which is subjected to distribution processing, enters a range of an authentication distance according to the plurality of candidate printing apparatuses;

a determination unit configured to select a route that connects a plurality of applied printing apparatuses which are extracted from the plurality of candidate printing apparatuses on the basis of a walking distance and a walking speed which are set to the request user in advance, the position information, the authentication distance, and specifications including a printing speed in the plurality of candidate printing apparatus, and to determine allocation of the printing job that is executed in the plurality of applied printing apparatuses;

a route notification unit that notifies the request user of information of the route; and a request information notification unit that notifies the plurality of applied printing apparatuses of request information including the allocation, wherein the determination unit determines the allocation on the basis of predetermined time at which the request user arrives so that when the request user moves along the route and sequentially acquires printed matters corresponding to the allocation, user waiting time until completion of output of the printed matters does not occur in each of the applied printing apparatus at which the request user arrives, the plurality of applied printing apparatuses are configured to initiate output of the printed matters corresponding to the allocation in a case where it is detected that the request user enters a range of the authentication distance, and the authentication distance corresponds to required time taken from initiation to completion of output of the printed matters corresponding to the allocation.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 24 is a schematic view illustrating Modification Example 6 according to the embodiment of the invention.

DESCRIPTION OF THE PREFERRED EMBODIMENTS

Figure 1:
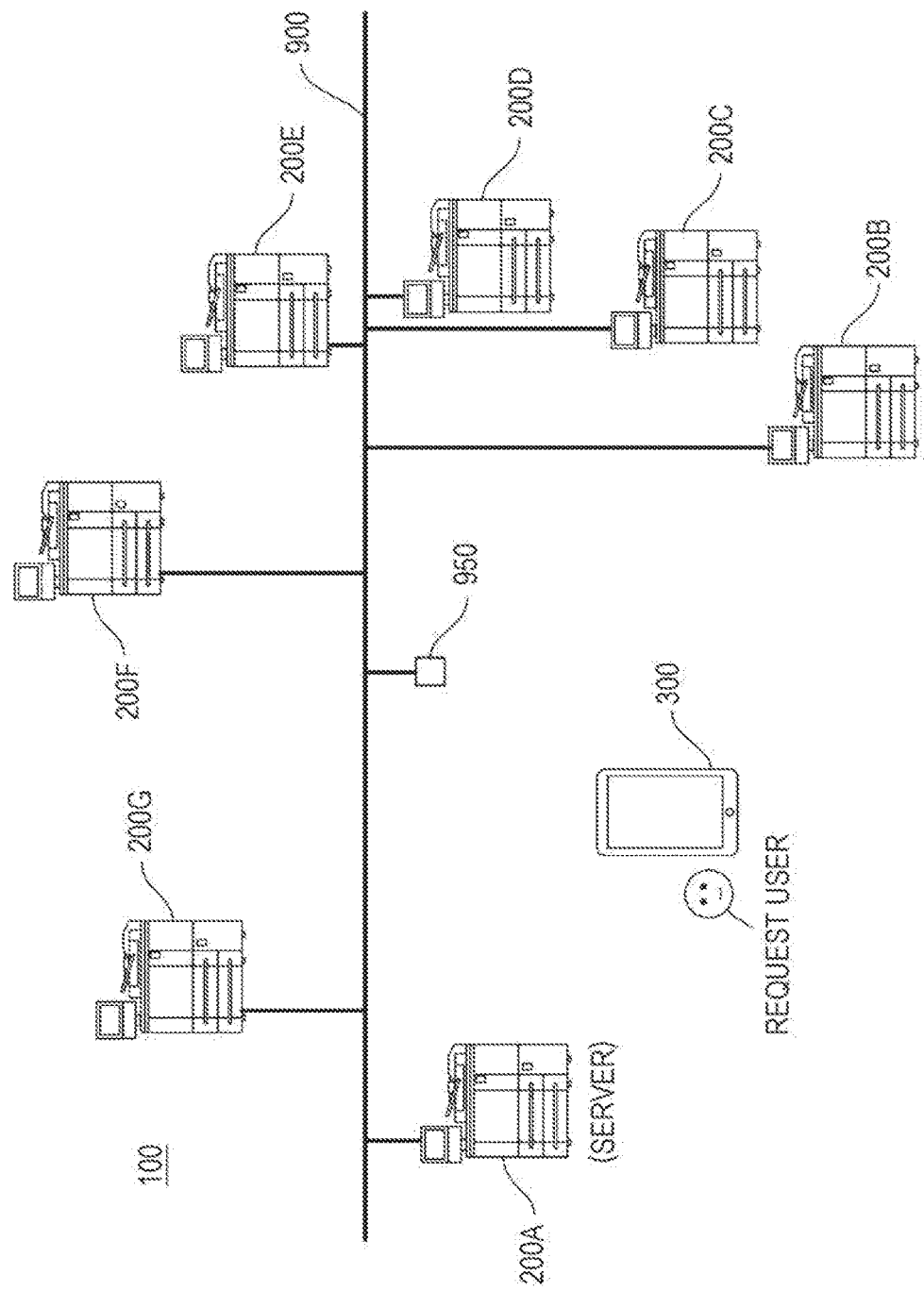
FIG. 1 is a schematic view illustrating a printing system according to an embodiment of the invention.

Hereinafter, an embodiment of the invention will be described with reference to the drawings. However, the scope of the invention is not limited to the illustrated examples. Furthermore, dimensional ratios in the drawings are exaggerated for convenience of description, and may be different from actual ratios.

FIG. 1 is a schematic view illustrating a printing system according to the embodiment of the invention.

A printing system 100 illustrated in FIG. 1 includes a plurality of printing apparatuses 200A to 200G, a mobile terminal 300, a network 900, and an access point 950, and is configured to perform distribution processing of a printing job requested from a user. The distribution processing is set so that a user (request user), who makes a request for a printing job subjected to the distribution processing, sequentially acquires printed matters corresponding to allocation of the printing job while walking (moving) along a predetermined route while securing security. In addition, the distribution processing is executed to achieve health promotion (increase in the number of walking steps).

For example, the printing apparatuses 200A to 200G are configured as a multi-functional peripheral (MFP) having a copying function, a printer function, and a scanning function, have a wireless LAN function, and are connected to the network 900. The mobile terminal 300 has a wireless LAN function, and is carried by the request user. The access point 950 is a wireless transceiver that is disposed in the network 900, and is used to connect the mobile terminal 300, which is a wireless LAN client, to the network 900.

The mobile terminal 300 can perform a communication with the printing apparatuses 200A to 200G through the access point 950 and the network 900 by using an infrastructure mode of the wireless LAN. In addition, the mobile terminal 300 can perform direct communication with the printing apparatuses 200A to 200G without through the access point 950 and the network 900 by using an ad hoc mode of the wireless LAN.

The network 900 is constituted by various networks such as a local area network (LAN) that connects computers or network apparatuses in accordance with standards such as Ethernet (registered trademark), Token Ring, and fiber-distributed data interface (FDDI), a wide area network (WAN) that connects LANs to each other with a dedicated line, the Internet, and a combination thereof. For example, a network protocol is a transmission control protocol/internet protocol (TCP/IP).

For example, of a mode of the wireless LAN is IEEE 801.11. For example, the direct communication between the mobile terminal 300 and the printing apparatuses 200A to 200G can be performed by appropriately using Bluetooth (registered trademark) that uses an electric wave with a band of 2.4 GHz without limitation to an aspect of using the wireless LAN.

Next, a configuration of the printing apparatuses 200A to 200G will be described in detail.

Figure 2:
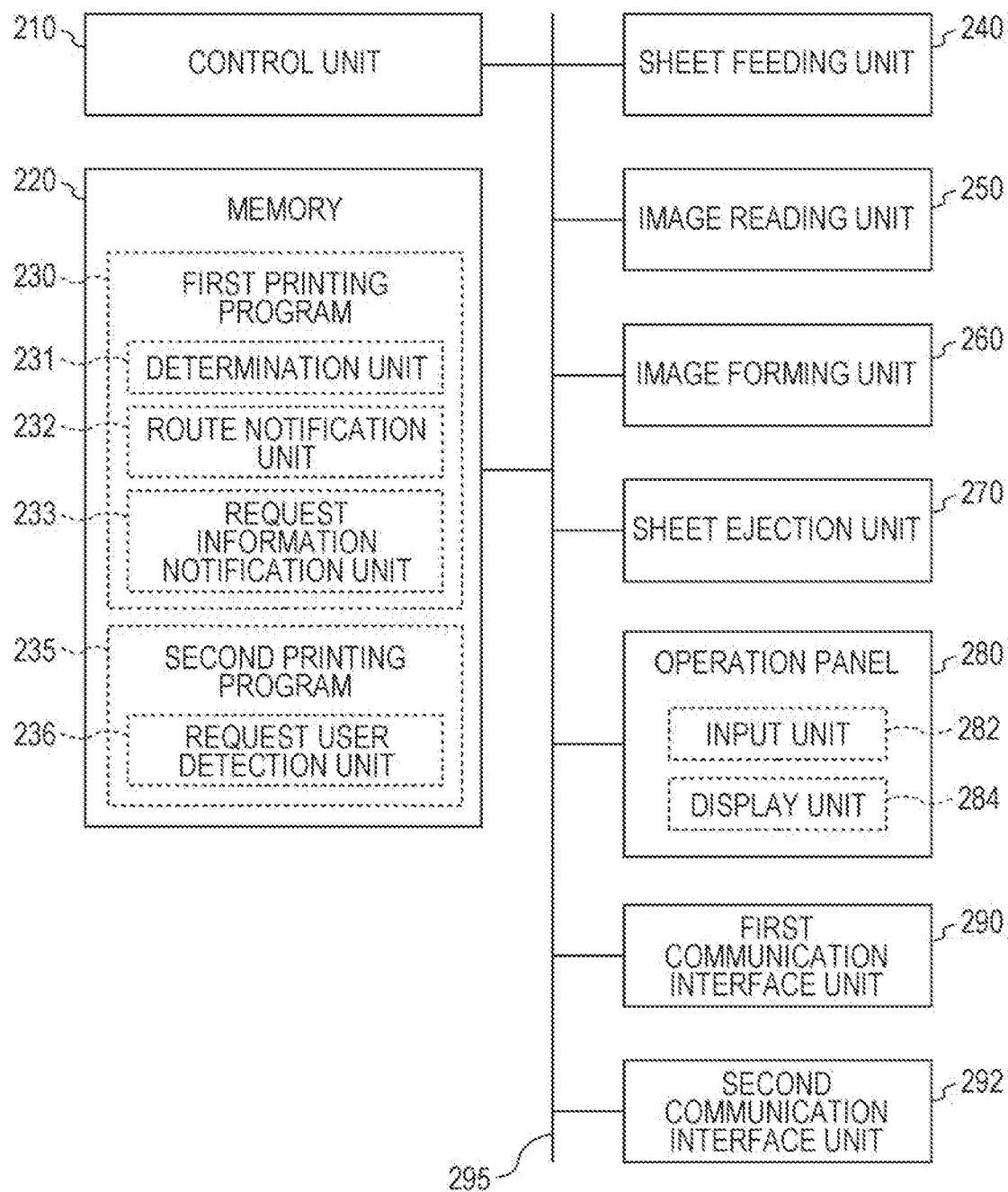
FIG. 2 is a block diagram illustrating a configuration of a printing apparatus illustrated in FIG. 1.

FIG. 2 is a block diagram illustrating a configuration of a printing apparatus illustrated in FIG. 1.

As illustrated in FIG. 2, each of the printing apparatuses 200A to 200G includes a control unit 210, a memory 220, a sheet feeding unit 240, an image reading unit 250, an image forming unit 260, a sheet ejection unit 270, an operation panel 280, a first communication interface 290, and a second communication interface 292, and these components are connected to each other through a bus 295.

The control unit 210 is a control circuit that is constituted by a microprocessor that executes a control of respective units and various kinds of arithmetic processing according to a program, and respective functions of the printing apparatuses 200A to 200G are exhibited when the control unit 210 executes programs corresponding to the respective functions.

The memory 220 is constituted by appropriately combining a high-speed random access storage device that temporarily stores a program and data as a working region, a large-capacity random access storage device that retains various processing programs or various pieces of data, and the like.

Examples of the data that is stored includes position information including distance data between the printing apparatuses 200A to 200G, setting data, printing job data transmitted from the first communication interface 290, read image data (scanned data) transmitted from the image reading unit 250, and the like. The setting data is data that is used in distribution processing for realizing health promotion (increase in the number of walking steps), and examples thereof include a walking distance of a request user, a walking speed, a walking (moving) route information, and the like.

Examples of the program that is stored include a first printing program 230, a second printing program 235, a raster image processing (RIP: rasterization) program, an image reading program, and the like.

The first printing program 230 is used to exhibit a function as a server (used also as a server) that manages the printing system 100 so as to execute distribution processing. The second printing program 235 is used to exhibit a function as a client of the distribution processing so as to output a printed matter corresponding to allocation of a printing job. For example, the RIP program is used to execute processing of converting image data, which is generated on the basis of a printing job, into raster image data that is used in the image forming unit 260. The image reading program is used to execute image processing such as A/D conversion, shading correction, filter processing, and image compression processing with respect to image data (scanned data), which is generated in the image reading unit 250, before being input to the image forming unit 260. Furthermore, details of the first printing program 230 and the second printing program 235 will be described later.

The sheet feeding unit 240 includes a plurality of sheet feeding trays, and is used to take out a sheet, which is instructed from the control unit 210, from the sheet feeding trays, and to convey the sheet toward the image forming unit 260.

For example, the image reading unit 250 is constituted by a scanner including a charge coupled device (CCD) image sensor, and is used to generate image data (scanned data) of an original document that is placed on an original document stage. An auto document feeder (ADF) may be provided to the image reading unit 250 as necessary.

The image forming unit 260 uses an image creating process such as an electrophotographic type process including a charging process, an exposing process, a development process, a transfer process, and a fixing process. The image forming unit 260 includes a print engine that forms an image on a sheet that is a recording medium, and is used to print image data. Printing (image formation) is not limited to an aspect of using the electrophotographic type process, and an impact type, a thermal transfer type, and an inkjet type may be appropriately applied to the printing.

The sheet ejection unit 270 includes a sheet ejection tray, and is used to eject a sheet that is printed (on which an image is formed) to the sheet ejection tray (the outside of the apparatus).

The operation panel 280 includes an input unit 282 and a display unit 284.

The input unit 282 includes a keyboard. The keyboard includes a plurality of keys including a numeric keypad that is used to set the number of copies and the like, a start key that is used to give an instruction for initiation of an operation, a stop key that is used to give an instruction for stopping of the operation, and the like. The input unit 282 is used to input characters, to perform various settings, and to give various instructions (inputs) such as a start instruction. For example, the request user can appropriately input a setting value, which is used to perform distribution processing so as to achieve health promotion (increase in the number of walking steps), by using the keyboard of the input unit 282. Examples of the setting value that is input in a manual include a walking distance or a walking speed of the request user, a route, and the like.

The display unit 284 is used to present the request user with information of a distribution processing mode, an apparatus configuration, a state of progress of a printing job, a setting that is currently changeable, and the like. For example, the display unit 284 is constituted by a liquid crystal display (LCD), a touch panel, and the like. The information of the distribution processing mode is information relating to a mode of subjecting the printing job to the distribution processing, and includes information of a route in which the request user acquires printed matters according to the distribution processing.

The first communication interface 290 is a communication unit (wired LAN module) that is constituted by an extension device that adds a communication function through the network 900, and is used to transmit and receive data to and from another printing apparatus that pertains to the network 900. Furthermore, the first communication interface 290 can transmit and receive data to and from the mobile terminal 300 through the access point 950.

Examples of the data that is transmitted and received include information of the route, request information, status information, and the like. The request information includes allocation of the printing job that is subject to the distribution processing.

The status information includes apparatus information, printing job information, and an apparatus status. For example, the status information is acquired by using a private area of a management information base (MIB)-II of a simple network management protocol (SNMP) that is a network management method defined by RFC1213.

Examples of the apparatus information include a manufacturer or a connection type. The printing job information includes the number of printing jobs in a standby state, presence or absence of a printing job in progress, information of a printing job that is completed, the number of pages and the number of copies according to each printing job, and a printing speed. The apparatus state includes a "printing-possible state", a "printing-impossible state", and a "warning" state.

Common management information services/common management information protocol (CMI/CMIP) or an individual type protocol may be applied to the status information without limitation to the aspect of using the SNMP protocol.

The second communication interface 292 is a communication unit (wireless LAN module) that is constituted by an extension device that adds a wireless communication function, and is used to transmit and receive data by directly performing a communication with the mobile terminal 300 without through the access point 950.

Furthermore, the first printing program 230 is not limited to an aspect of being installed to the entirety of the printing apparatuses 200A to 200G.

Next, a configuration of the mobile terminal 300 will be described.

Figure 3:
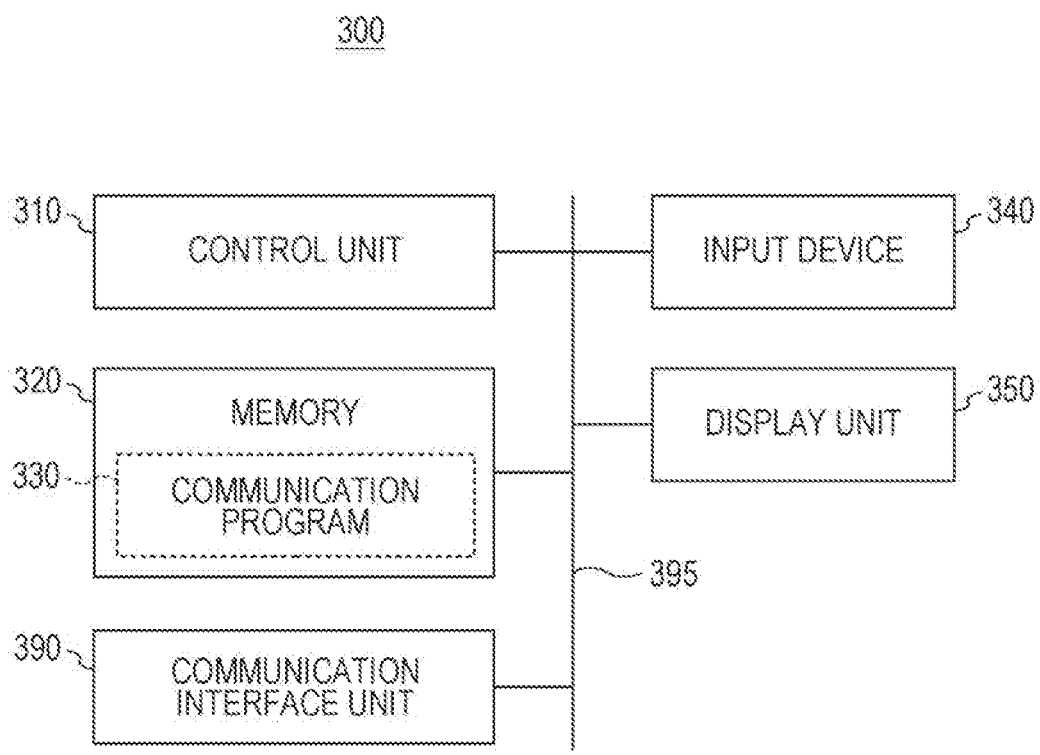
FIG. 3 is a block diagram illustrating a configuration of a mobile terminal illustrated in FIG. 1.

FIG. 3 is a block diagram illustrating the configuration of the mobile terminal illustrated in FIG. 1.

For example, the mobile terminal 300 is a portable telephone. The mobile terminal 300 includes a control unit 310, a memory 320, an input device 340, a display unit 350, and a communication interface 390 as illustrated in FIG. 3, and these components are connected to each other through a bus 395. Furthermore, the mobile terminal 300 may be constituted by, for example, a dedicated terminal without limitation to the type of the portable telephone.

The control unit 310 is a control circuit that is constituted by a microprocessor and the like which perform a control of respective units or various kinds of arithmetic processing according to a program. Respective functions of the mobile terminal 300 are exhibited when the control unit 310 executes programs corresponding to the functions.

The memory 320 is constituted by appropriately combining a high-speed random access storage device that temporally stores a program and data as a working region, a large-capacity random access memory that stores various kinds of processing programs or various kinds of data, and the like.

Examples of the program that is stored include an operating system (OS) and a communication program 330. The communication program 330 is used to directly perform a communication with the printing apparatuses 200A to 200G by using an Ad hoc mode of a wireless LAN. Examples of the data that is stored include authentication information of the request user that carries the mobile terminal 300. The authentication information of the request user is transmitted to the printing apparatuses 200A to 200G by the communication program 330, and is used by the second printing program 235.

For example, the input device 340 includes a touch panel and a fixed key, and is used to perform various kinds of input. A type of the touch panel is not particularly limited, and a resistive film type, an electrostatic capacitance type, a surface acoustic wave type, an infrared ray type, an electromagnetic induction type, a load detection type, and the like can be appropriately used. The fixed key is constituted by a push button type switch, a keyboard, and the like.

For example, the display unit 350 is a liquid crystal display (LCD) or an organic electroluminescence display (OELD), and is used to display various kinds of information such as a setting, a processing result, an alarm, and a message. The touch panel of the input device 340 may be integrated with the display unit 350.

The communication interface 390 is a communication unit (wireless LAN module) that is constituted by an extension device that adds a wireless communication function, and is used to transmit and receive data to and from the printing apparatuses 200A to 200G through the access point 950 and the network 900, or through a direct communication with the printing apparatuses 200A to 200G. Examples of the data that is transmitted and received include authentication information of the request user that carries the mobile terminal 300.

Next, the first printing program 230 will be described with reference to FIG. 2, FIG. 4, and FIG. 5.

Figure 4:
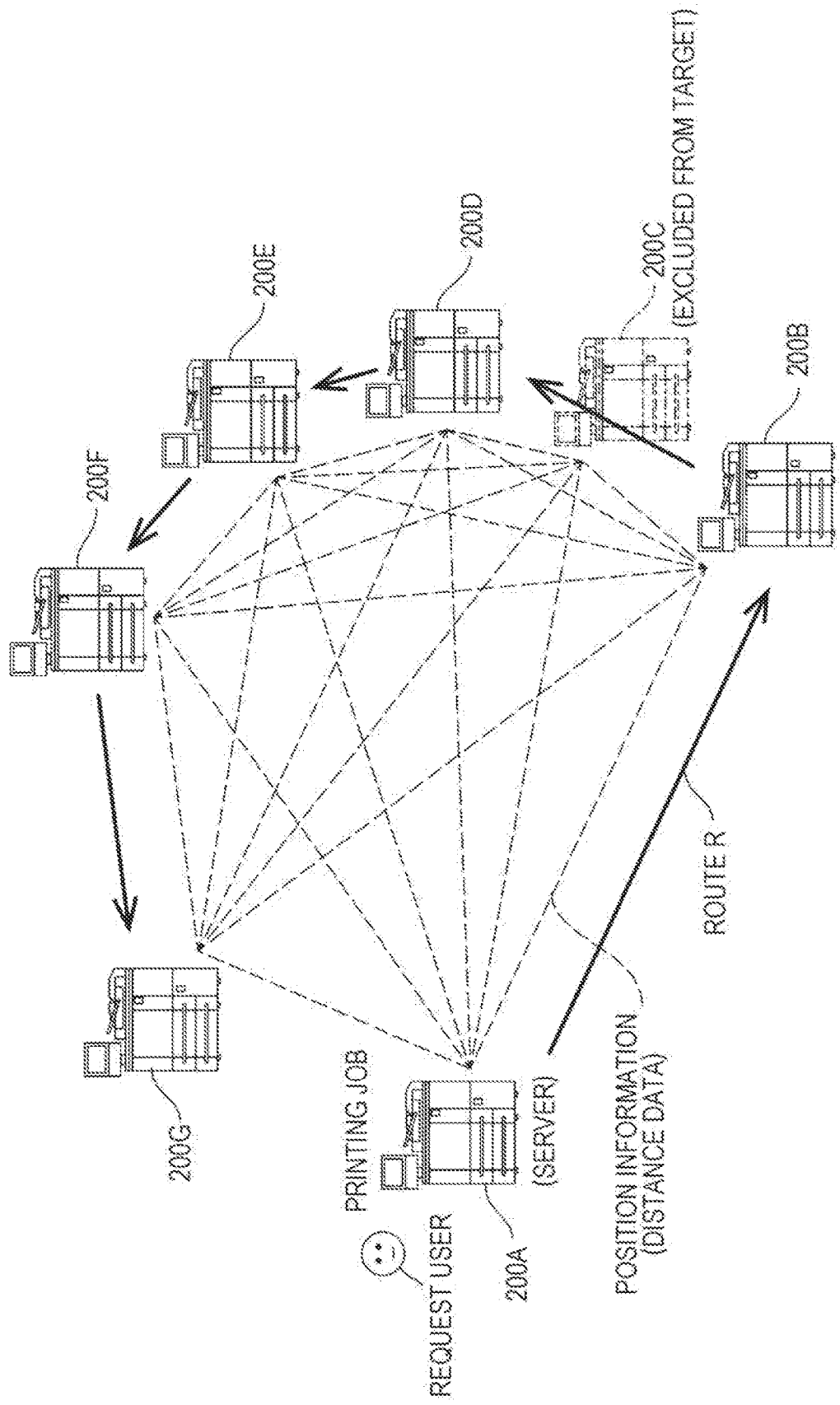
FIG. 4 is a schematic view illustrating a route that is selected in a determination unit of a first printing program illustrated in FIG. 2.
Figure 5:
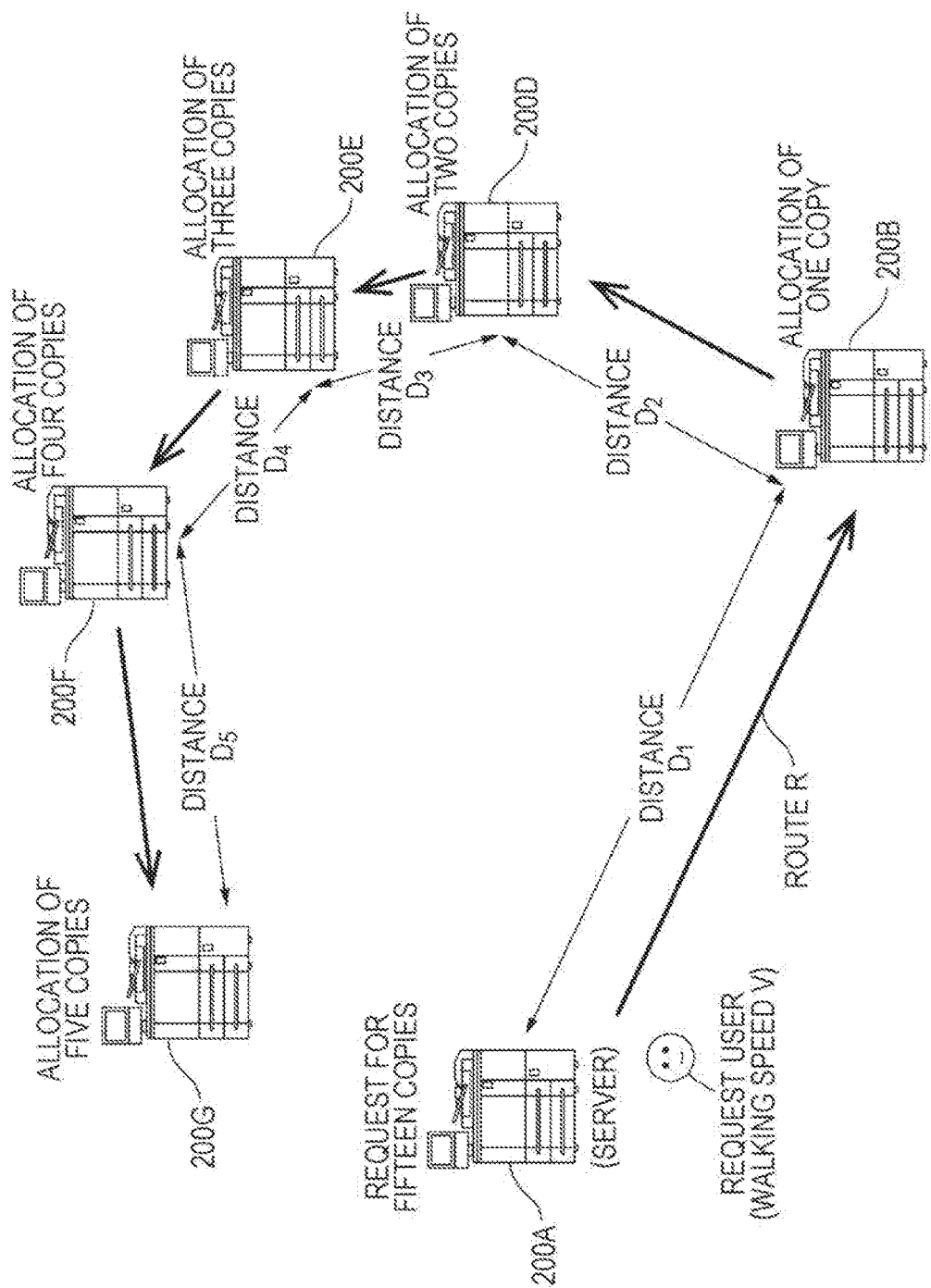
FIG. 5 is a schematic view illustrating allocation of a printing job that is determined in a determination unit.

FIG. 4 is a schematic view illustrating a route that is selected in a determination unit of the first printing program illustrated in FIG. 2, and FIG. 5 is a schematic view illustrating allocation of a printing job that is determined in the determination unit.

The first printing program 230 includes a determination unit 231, a route notification unit 232, and a request information notification unit 233 (refer to FIG. 2).

The determination unit 231 realizes a determination procedure of selecting a route that connects a plurality of applied printing apparatuses which are extracted from a plurality of candidate printing apparatuses on the basis of a walking distance and a walking speed of the request user, position information, authentication information, and specifications of the plurality of candidate printing apparatuses such as a printing speed, and of determining allocation of a printing job that is executed in the plurality of applied printing apparatuses. Furthermore, details of the selection of the route and the determination of the allocation of the printing job will be described later.

The walking distance is calculated by multiplying the walking speed by walking time. Accordingly, it is also possible to use the product of the walking speed and the walking time instead of the walking distance, or the quotient obtained by dividing the walking distance by the walking time instead of the walking speed. In addition, the walking distance is also calculated by multiplying the number of walking steps by a step length, and thus the product of the step length and the number of walking steps may be used instead of the walking distance.

The authentication distance corresponds to required time taken from initiation to completion of output of printed matters corresponding to allocation of a printing job. In this embodiment, the authentication distance is calculated by multiplying the required time taken from initiation to completion of the output of the printed matters corresponding to the allocation of the printing job by the walking speed of the request user, and the required time is calculated by dividing the number of copies of the printed matters corresponding to the allocation of the printing job by the printing speed.

Furthermore, in an example illustrated in FIG. 4, candidate printing apparatuses are the printing apparatuses 200A to 200G, the applied printing apparatuses are the printing apparatuses 200A, 200B, and 200D to 200G, and the route R along which the request user walks (moves) connects the printing apparatuses 200A, 200B, and 200D to 200G. In addition, a printing apparatus that functions as a server is the printing apparatus 200A.

The determination unit 231 determines the allocation of the printing job so that when the request user moves along the route R and sequentially acquires printed matters corresponding to the allocation of the printing job, user waiting time until completion of output of the printed matters corresponding to the allocation of the printing job does not occur in each of the applied printing apparatus at which the request user arrives. For example, the determination unit 231 determines an amount capable of being processed before predetermined time as the allocation of the printing job on the basis of the predetermined time at which the request user arrives at the applied printing apparatus in order for the user waiting time does not occur.

Accordingly, when sequentially acquiring the printed matters, it is necessary for the request user to continuously walk without an interval, and thus it is possible to expect a walking effect. That is, it is possible to efficiently achieve health promotion (increase in the number of walking steps) of a user.

Furthermore, the route R along which the request user walks is selected, for example, as follows.

A candidate route corresponding to a walking distance of the request user is extracted on the basis of a distance (position information) between candidate printing apparatuses. In addition, in a case where inappropriate printing apparatus is not included in the candidate route, the candidate route is selected as the route R. In addition, in a case where an inappropriate printing apparatus is included in the candidate route, the inappropriate printing apparatus is excluded from the candidate printing apparatuses, and a candidate route is extracted again.

The inappropriate printing apparatus is a printing apparatus having a problem related to specifications. Examples of the inappropriate printing apparatus includes a printing apparatus in which a printing speed is too late, and allocation of a printing job without occurrence of user waiting time is impossible, and a printing apparatus that is difficult to correspond to a request (for example, color printing, and double-sided printing) according to a printing job.

For example, the allocation of the printing job is determined as follows.

Basically, setting is made in such a manner that allocation of the printing job further increases with respect to a printing apparatus (located on a downstream side of a route) of which a distance from a start position (a position of a printing apparatus 200A for which a request for the printing job subjected to distribution processing is made) is great. In addition, in a case where a printing speed of the printing apparatus, of which a distance from the start position is great, is fast, adjustment is made to increase the setting of the allocation of the printing job, and in a case where the printing speed is slow, adjustment is made to decrease the setting of the allocation of the printing job. According to this, arrival of the request user and completion timing of output of printed matters corresponding to allocation of the printing job match each other in order for user waiting time not to occur in a printing apparatus at which the request user arrives.

Specifically, as illustrated in FIG. 5, when a distance [m] between the printing apparatuses 200A, 200B, and 200D to 200G is expressed as $D_1$, $D_2$, $D_3$, $D_4$, or $D_5$, a walking speed [m/s] of the request user is expressed as V, and predetermined walking time [s] between the printing apparatuses 200A, 200B, and 200D to 200G is expressed as $T_1$, $T_2$, $T_3$, $T_4$, or $T_5$, the predetermined walking time $T_1$, $T_2$, $T_3$, $T_4$, or $T_5$ is calculated by dividing the distance $D_1$, $D_2$, $D_3$, $D_4$, or $D_5$ by V.

In addition, when a printing speed [PPM] of the printing apparatuses 200B, and 200D to 200G is set to the same and is expressed as X for simplification of description, the numbers of printable copies $N_B$, $N_D$, $N_E$, $N_F$, and $N_G$ of the printing apparatuses 200B, and 200D to 200G are calculated by dividing a value, which is obtained by multiplying total predetermined walking time by the printing speed X, by 60 ($N_B=T_1 \times X/60$, $N_D=(T_1+T_2)\times X/60$, $N_E=(T_1+T_2+T_3)\times X/60$, $N_F=(T_1+T_2+T_3+T_4)\times X/60$, $N_G=(T_1+T_2+T_3+T_4+T_5)\times X/60$). That is, a relationship of $N_B<N_D<N_E<N_F<N_G$ is established, and the number of printable copies further increases in a printing apparatus on a more downstream side in the route R. That is, it is possible to determine allocation of the printing job that is executed in the printing apparatuses 200B, and 200D to 200G on the basis of the walking speed of the request user and printing speeds (specifications) of the printing apparatuses 200B, and 200D to 200G.

For example, in an example illustrated in FIG. 5, a request for fifteen copies is made to the printing apparatus 200A as the printing job, and one copy, two copies, three copies, four copies, and five copies can be allocated to the printing apparatus 200B, the printing apparatus 200D, the printing apparatus 200E, the printing apparatus 200F, and the printing apparatus 200G.

Figure 6:
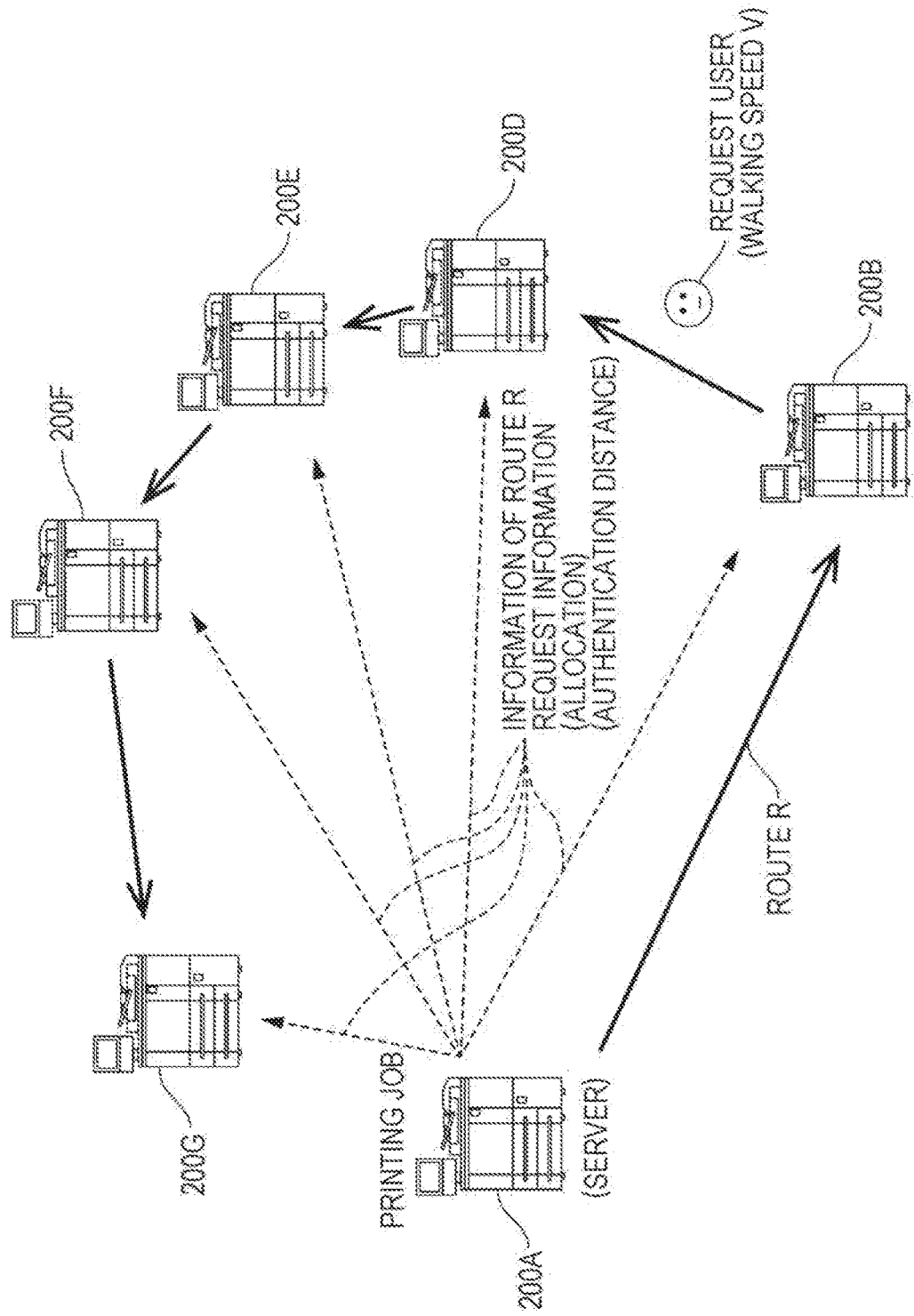
FIG. 6 is a schematic view illustrating a route notification unit and a request information notification unit of a first printing program.

FIG. 6 is a schematic view illustrating the route notification unit and the request information notification unit of the first printing program.

The route notification unit 232 realizes a route notification procedure of notifying the request user of information of the route (FIG. 6) by using the display unit 284 of the operation panel 280 of the applied printing apparatuses so as to support walking of the request user. That is, the applied printing apparatuses are notified of an instruction for displaying the information of the route on the display unit 284.

The request information notification unit 233 realizes a request information notification procedure of notifying the applied printing apparatus of request information (FIG. 6) including allocation of the printing job that is subjected to distribution processing.

In this embodiment, the route R is selected so that walking of the request user does not stop. In addition, the walking distance of the request user is calculated by multiplying elapsed time taken from walking initiation of the request user, by the walking speed of the request user. Accordingly, it is possible to predict a position of the request user in the route R according to the elapsed time. Accordingly, the information of the route and the request information are not limited to an aspect of being transmitted at a time when walking of the request user is initiated, and the information of the route and/or the request information may be sequentially transmitted to a printing apparatus in the vicinity of a predicted position at which the request user arrives in correspondence with the elapsed time.

Next, the second printing program 235 will be described with reference to FIG. 2 and FIG. 7.

Figure 7:
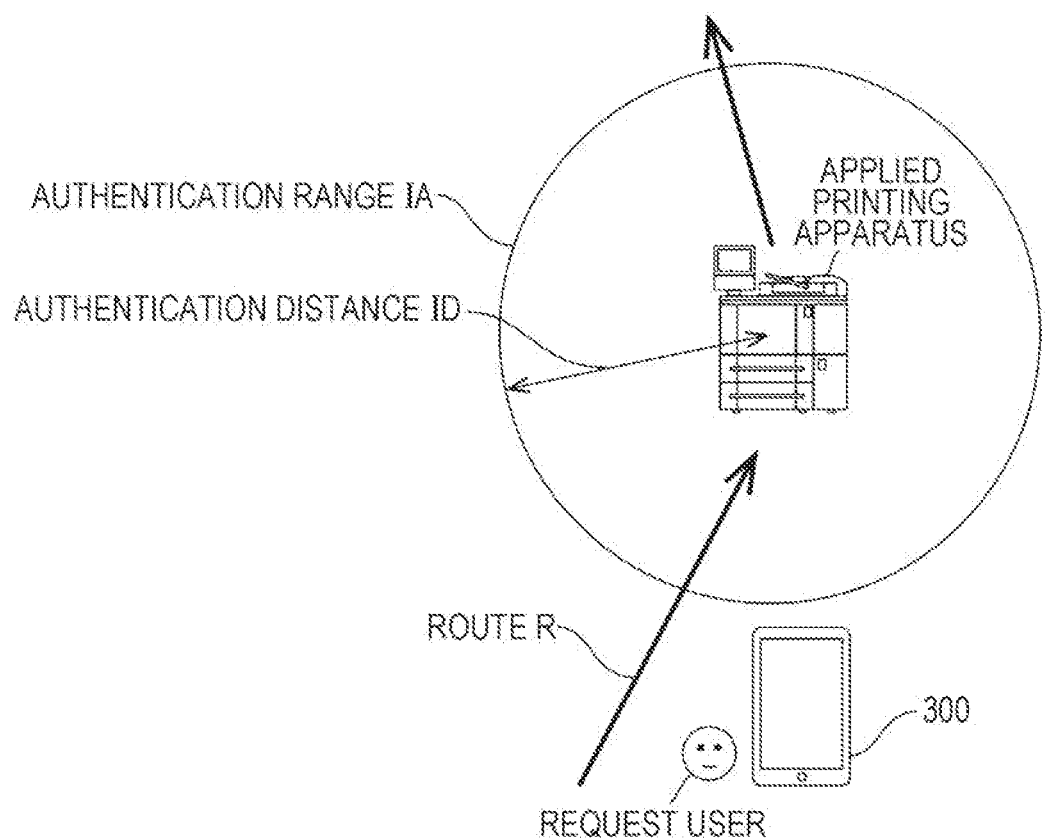
FIG. 7 is a schematic view illustrating an authentication distance and an authentication range according to a request user detection program illustrated in FIG. 2.

FIG. 7 is a schematic view illustrating an authentication distance and an authentication range according to a request user detection program illustrated in FIG. 2.

The second printing program 235 includes a request user detection unit 236 (refer to FIG. 2). As illustrated in FIG. 7, the request user detection unit 236 realizes a request user detection procedure of detecting that the request user enters a range (authentication range IA) of an authentication distance ID of the applied printing apparatuses (printing apparatuses 200A to 200G).

In this embodiment, the request user detection unit 236 authenticates a user who carries the mobile terminal 300 as the request user in accordance with authentication information of the mobile terminal 300, and specifies a position of the mobile terminal 300 (detects that the mobile terminal 300 enters a range of the authentication distance) on the basis of wireless intensity (electric wave intensity attenuation based on a distance) that is output from the mobile terminal 300. That is, the position of the request user is substituted with the position of the mobile terminal 300 that is carried by the request user. In addition, in this embodiment, the authentication range IA is a circular shape which centers around a position of a printing apparatus and of which a radius is set to the authentication distance ID.

Furthermore, when functioning as a client of the distribution processing, the printing apparatuses 200A to 200G are configured to initiate output of printed matters corresponding to allocation of the printing job in a case where it is detected that the request user enters the authentication range IA. Accordingly, information leakage is suppressed, and thus security is secured.

Next, description will be given of an operation of the determination unit in a case where authentication ranges intersect each other.

Figure 8:
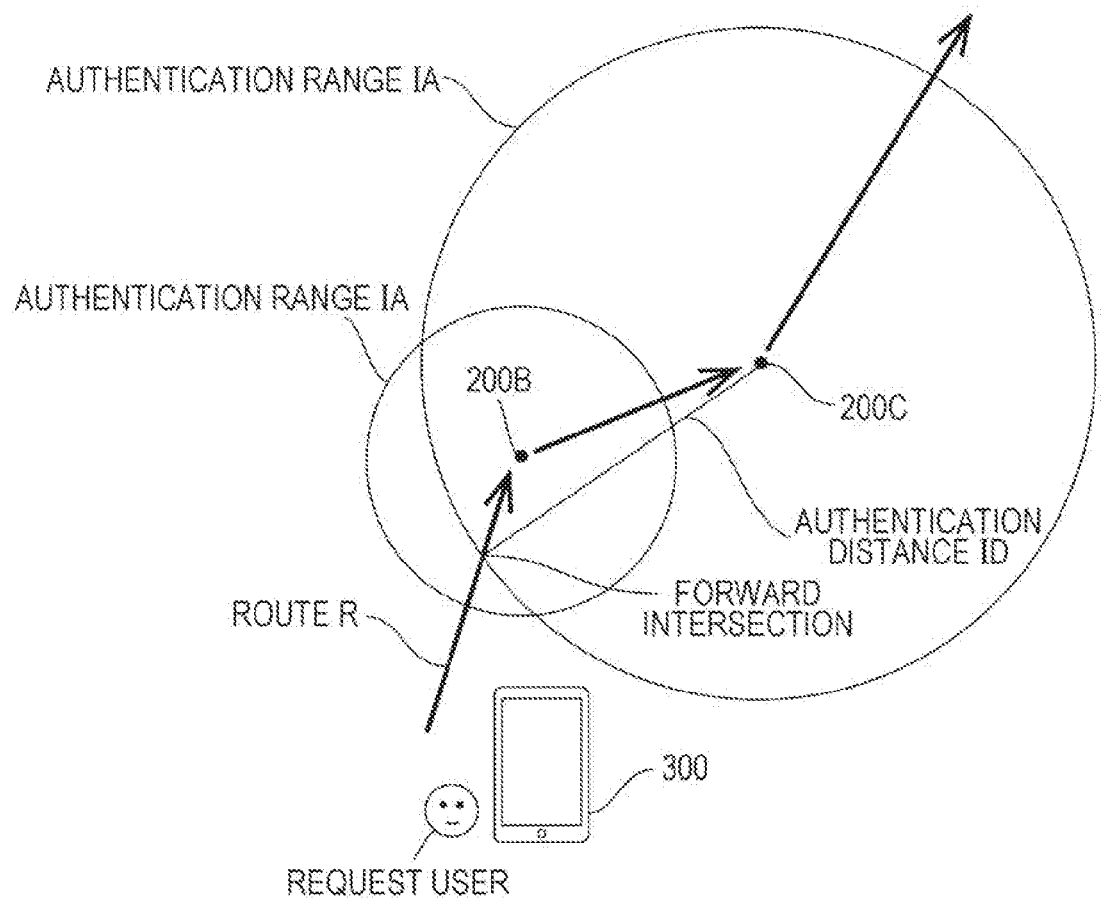
FIG. 8 is a schematic view illustrating a forward intersection.
Figure 9:
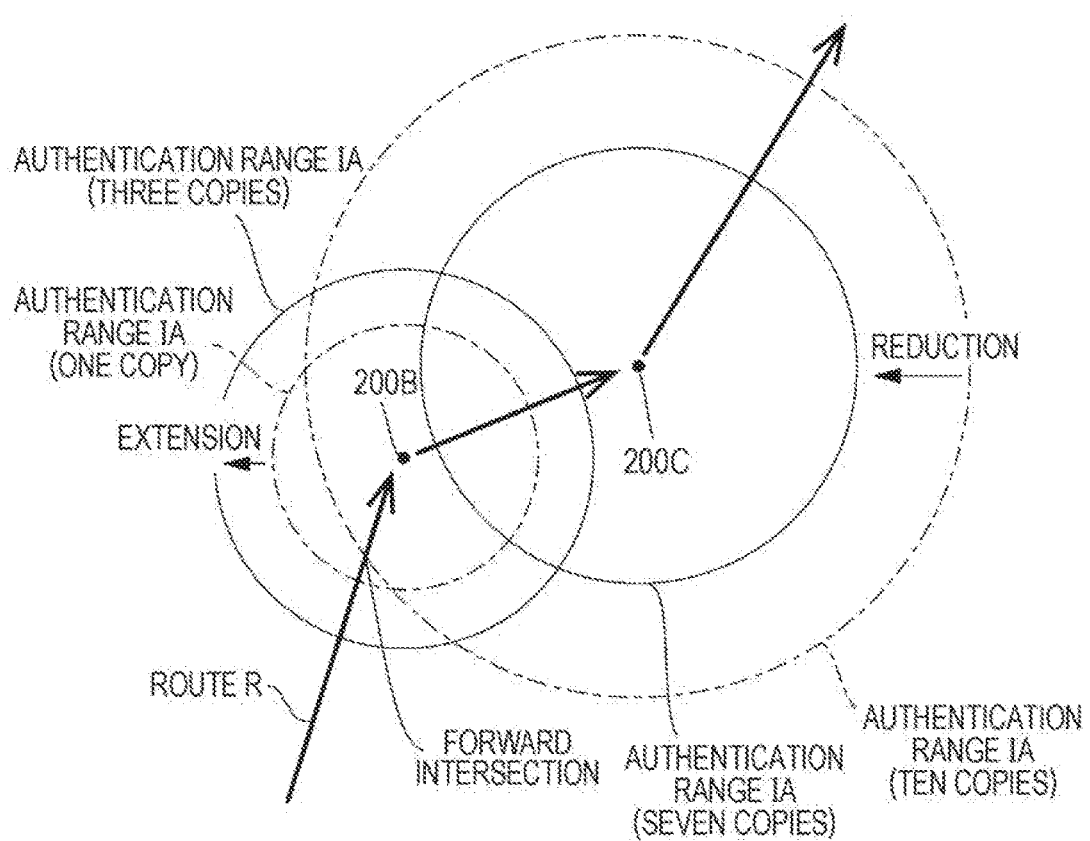
FIG. 9 is a schematic view illustrating an example of a method of eliminating the forward intersection.
Figure 10:
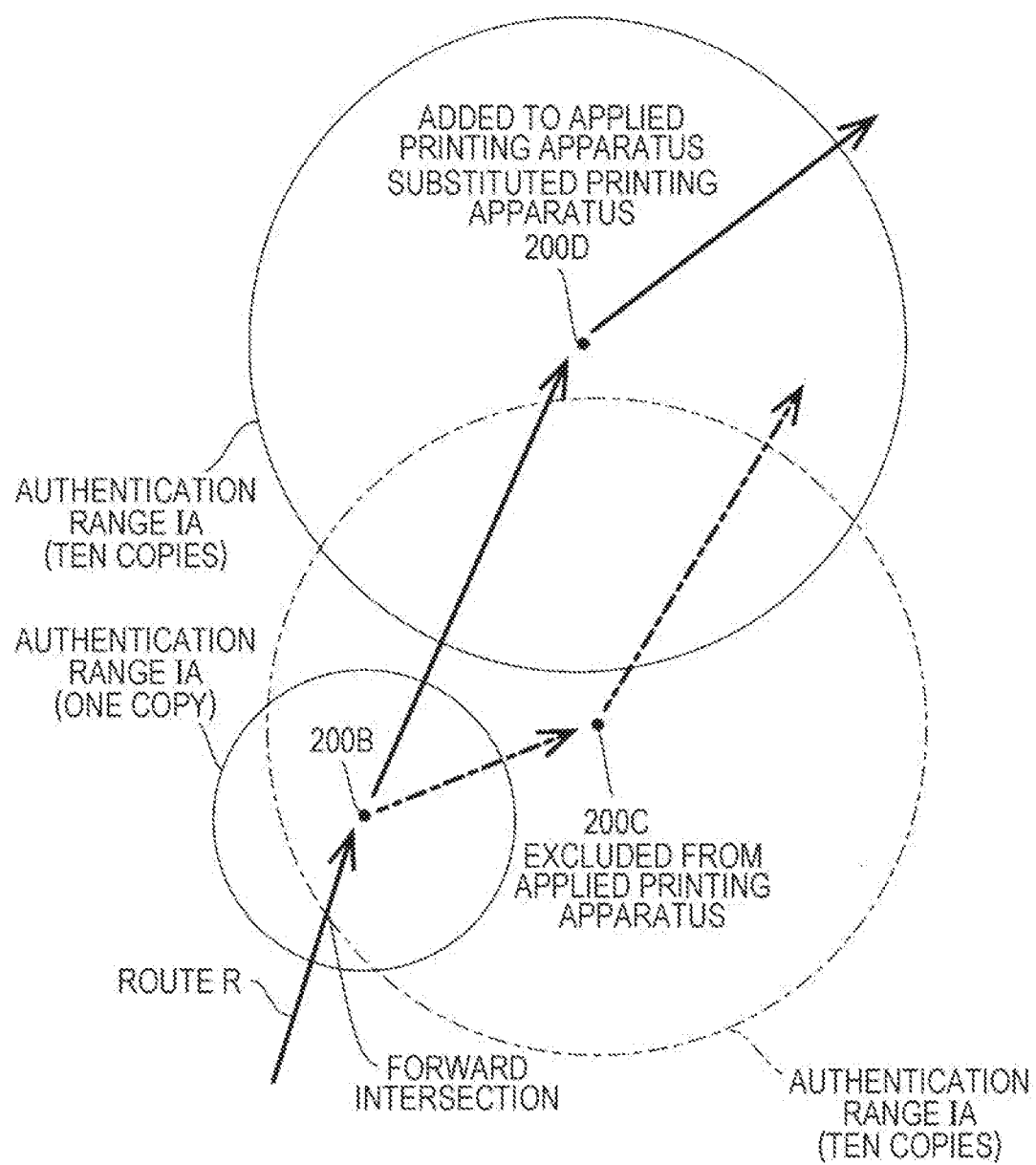
FIG. 10 is a schematic view illustrating another example of the method of eliminating the forward intersection.
Figure 11:
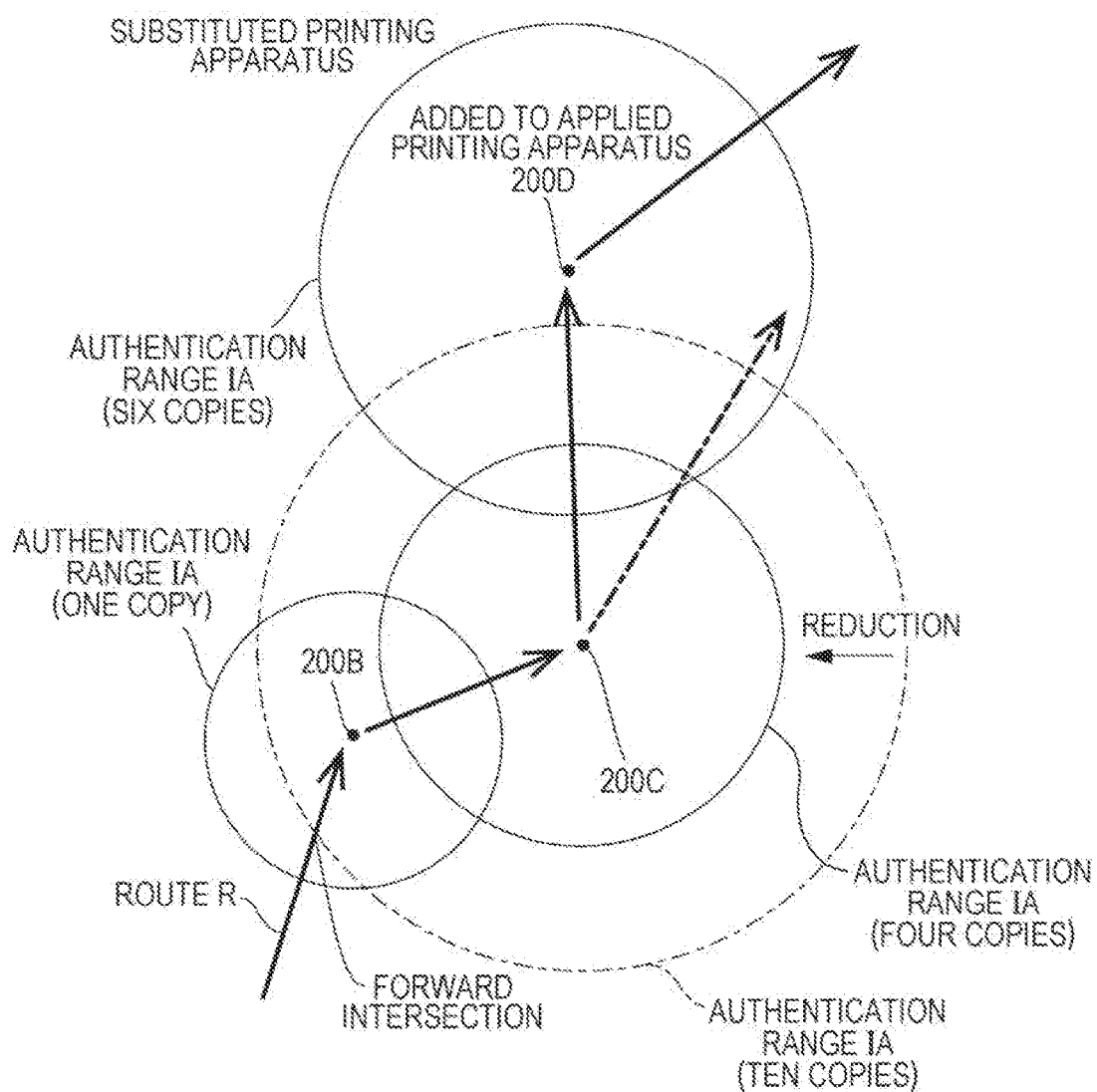
FIG. 11 is a schematic view illustrating still another example of the method of eliminating the forward intersection.

FIG. 8 is a schematic view illustrating a forward intersection, and FIG. 9 to FIG. 11 are schematic views illustrating an example of a method of eliminating the forward intersection. In the following description, a (preceding) printing apparatus that is located on an upstream side is referred to as a first printing apparatus, and a (subsequent) printing apparatus that is located on a downstream side is referred to as a second printing apparatus.

As an example, description will be given of a case where allocation of a printing job with respect to the printing apparatus 200C is great, and an authentication range IA of the printing apparatus 200C overlaps an authentication range IA of the printing apparatus 200B and intersects a route R toward the printing apparatus 200B (a case where the printing apparatus 200B and the printing apparatus 200C are the first printing apparatus and the second printing apparatus, respectively) with reference to FIG. 8.

The request user moves toward the first printing apparatus 200B along the route R. When detecting that the request user (mobile terminal 300) enters the authentication range IA of the first printing apparatus 200B by the second printing program 235, the first printing apparatus 200B initiates output of printed matters corresponding to allocation of a printing job. In addition, when arriving at the first printing apparatus 200B, the request user acquires the printed matters which are output without occurrence of user waiting time, and moves toward the second printing apparatus 200C that is a next destination along the route R.

When detecting that the request user (mobile terminal 300) enters an authentication range IA of the second printing apparatus 200C, the second printing apparatus 200C initiates output of printed matters corresponding to allocation of the printing job. However, the request user does not move toward the second printing apparatus 200C from a point (forward intersection) at which the route R toward the first printing apparatus 200B and the authentication range IA of the second printing apparatus 200C intersect each other. That is, walking time of the request user until reaching the second printing apparatus 200C from the forward intersection through the first printing apparatus 200B becomes longer than required time in a case where the request user walks over the authentication distance ID of the second printing apparatus 200C.

An authentication distance corresponds to required time taken from initiation to completion of output of printed matters corresponding to allocation of a printing job. Accordingly, output of printed matters in the second printing apparatus 200C is completed before the request user (mobile terminal 300) reaches the second printing apparatus 200C, and thus there is a concern that it is difficult to suppress information leakage. Accordingly, it is preferable to change the route and the allocation of the printing job in the determination unit 231 to eliminate the forward intersection.

For example, the determination unit 231 can eliminate the forward intersection by adjusting allocation of a printing job of applied printing apparatuses so that allocation of the printing job of the first printing apparatus 200B increases. That is, the forward intersection is eliminated by increasing allocation (authentication distance ID) of the printing job of the first printing apparatus 200B as much as possible and by reducing allocation (authentication distance ID) of the printing job of the second printing apparatus 200C as much as possible. Furthermore, in an example illustrated in FIG. 9, allocation of the printing job of the first printing apparatus 200B and the second printing apparatus 200C is set to one copy and ten copies, respectively, and the allocation is changed to three copies and seven copies, respectively, so as to eliminate the forward intersection.

Elimination of the forward intersection is also possible by extracting an additional applied printing apparatus, and by changing a route and/or allocation of a printing job.

For example, as illustrated in FIG. 10, when the route R is determined by excluding the second printing apparatus 200C from the applied printing apparatuses, and by adding a third printing apparatus 200D, which is an applied printing apparatus without overlapping of the authentication range IA, as a substitution for the second printing apparatus 200C, it is possible to eliminate the forward intersection. Furthermore, in an example illustrated in FIG. 10, allocation of ten copies with respect to the second printing apparatus 200C is canceled, and ten copies can be allocated with respect to the third printing apparatus 200D as a substitution for the allocation.

In addition, as illustrated in FIG. 11, it is also possible to change the route R and allocation of the printing job by adding the third printing apparatus 200D without excluding the second printing apparatus 200C from the applied printing apparatuses. Furthermore, in an example illustrated in FIG. 11, a printing job of four copies can be allocated to the third printing apparatus 200D instead of reducing allocation of the printing job of the second printing apparatus 200C from ten copies to six copies.

The method of eliminating the forward intersection is not limited to the above-described aspect. For example, when a reciprocating path is provided in the route R to divide allocation of the printing job and to reduce the authentication range IA, it is possible to perform adjustment for elimination of the forward intersection.

Next, description will be given of an operation of the printing apparatus 200A that functions as a server.

Figure 12:
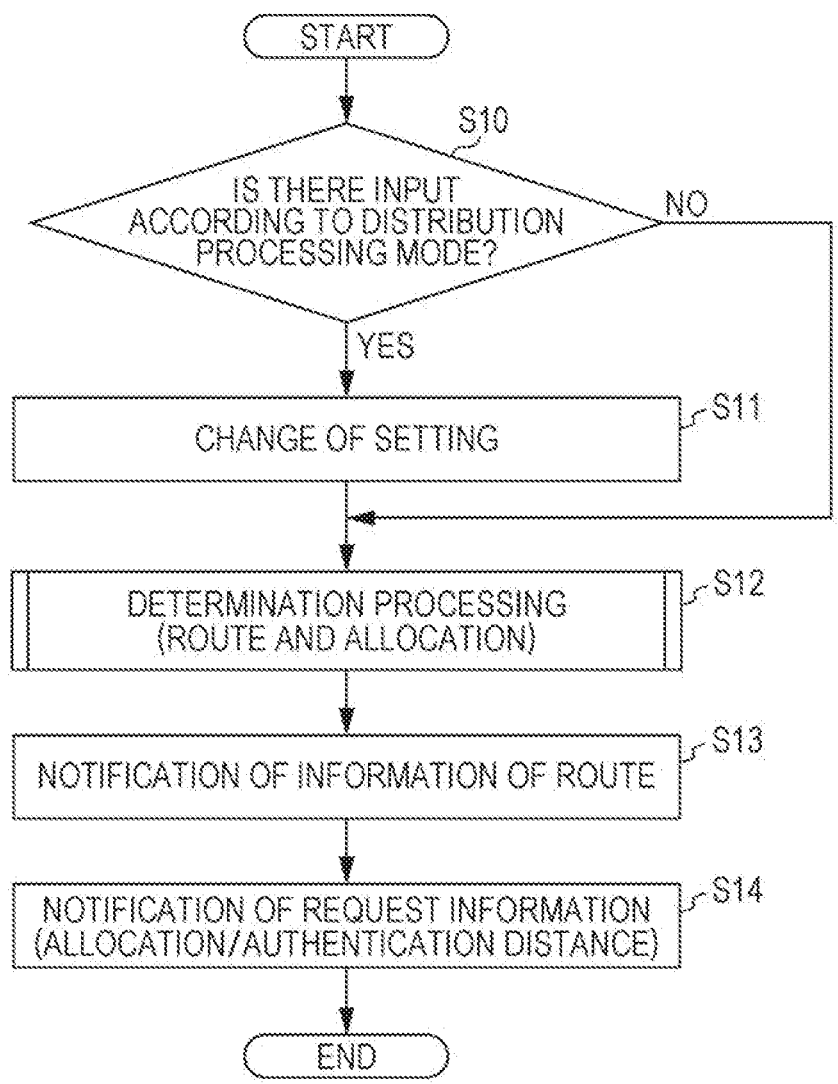
FIG. 12 is a flowchart illustrating an operation of a printing apparatus that functions as a server.
Figure 13:
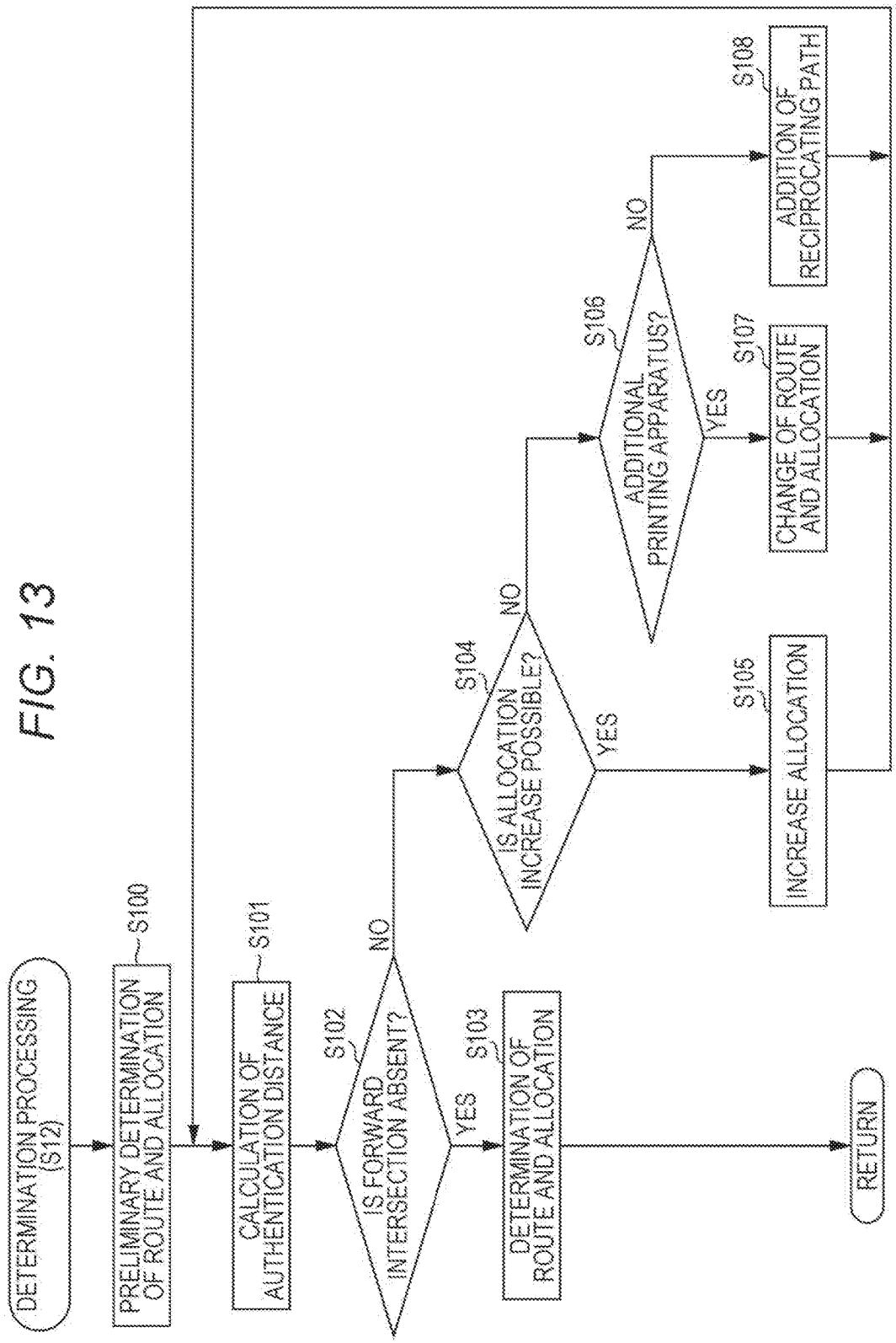
FIG. 13 is a flowchart illustrating determination processing in step S12 of FIG. 12.

FIG. 12 is a flowchart illustrating an operation of a printing apparatus that functions as a server, and FIG. 13 is a flowchart illustrating determination processing in step S12 of FIG. 12. Furthermore, algorithms illustrated by the flowcharts in FIG. 12 and FIG. 13 are stored as the first printing program 230, and are executed by the control unit 210 of the printing apparatus 200A.

As illustrated in FIG. 12, first, it is determined whether or not input according to a distribution processing mode is made from the request user (step S10).

In a case where it is determined that an input according to the distribution processing mode is not made from the request user (NO in step S10), the process proceeds to step S12. In a case where it is determined that the input according to the distribution processing mode is made from the request user (YES in step S10), a setting is changed (step S11), and the process proceeds to step S12. For example, the setting that is changed is a walking distance or a walking speed.

In step S12, determination processing is performed by the determination unit 231, and the route R and allocation of a printing job are determined.

Then, information of the route R along which the request user walks is given in notification (is transmitted) to the printing apparatuses 200B, and 200D to 200G, which function as a client of the distribution processing, by the route notification unit 232 (step S13). In addition, request information including allocation of a printing job and an authentication distance is given in notification (is transmitted) to the printing apparatuses 200B, and 200D to 200G by the request information notification unit 233 (step S14), and the process is terminated.

According to this, the printing apparatuses 200B, and 200D to 200G display the information of the route R on the display unit 284 of the operation panel 280, and initiates output of printed matters corresponding to allocation of the printing job when detecting that the request user enters an authentication range (a range of the authentication distance).

The information of the route R can appropriately include information that specifies a printing apparatus that is located in the route R, a distance and predetermined walking time between printing apparatuses adjacent to each other in the route R, a walking speed, and the like.

Next, description will be given of the determination processing in step S12.

As illustrated in FIG. 13, first, preliminary determination of the route R and allocation of the printing job is made (step S100).

In the preliminary determination, a route R, which connects the printing apparatuses 200A, 200B, and 200D to 200G as applied printing apparatuses extracted from the printing apparatuses 200A to 200G on the basis of a walking distance of the request user, position information, and a printing speed (specifications) of the printing apparatuses 200A to 200G as candidate printing apparatuses, is selected, and allocation of a printing job to be executed in the printing apparatuses 200A, 200B, and 200D to 200G is determined on the basis of the walking speed of the request user and the printing speed (specifications) of the printing apparatuses 200A, 200B, and 200D to 200G. At this time, the allocation of the printing job is determined on the basis of predetermined time at which the request user arrives so that when the request user moves along the route R and sequentially acquires printed matters corresponding to the allocation of the printing job, user waiting time until completion of output of the printed matters does not occur in each of the applied printing apparatus at which the request user arrives.

Then, the authentication distance is calculated (step S101), and it is determined whether or not the forward intersection is present (step S102).

In a case where it is determined that the forward intersection is not present (YES in step S102), the route R and the allocation of the printing job in the preliminary determination are determined as a final route R and allocation of the printing job (step S103), and the process is returned.

In a case where it is determined that the forward intersection is present (NO in step S102), for example, in a case where the authentication range of the printing apparatus 200C overlaps the authentication range IA of the printing apparatus 200B, and intersects the route R toward the printing apparatus 200B (in a case where the printing apparatus 200B and the printing apparatus 200C are the first printing apparatus and the second printing apparatus), it is determined whether or not it is possible to increase allocation of the printing job of the first printing apparatus 200B (step S104).

In a case where it is determined that the allocation of the printing job can be increased (YES in step S104), the allocation of the printing job of the first printing apparatus 200B is increased to eliminate the forward intersection, and allocation of the applied printing apparatuses is adjusted (step S105) (refer to FIG. 9), and the process returns to step S101.

In a case where it is determined that the allocation of the printing job cannot be increased (NO in step S104), it is determined whether or not an applied printing apparatus capable of being added exists (step S106).

In a case where it is determined that an applied printing apparatus (third printing apparatus 200D) capable of being added exists (YES in step S106), the printing apparatus 200D is added, and the route R and the allocation of the printing job are changed so as to eliminate the forward intersection (refer to FIG. 11), and the process returns to step S101. Furthermore, it is also possible employ a configuration in which the route R is determined by excluding the second printing apparatus 200C from the applied printing apparatuses, and by adding the third printing apparatus 200D without overlapping of the authentication range IA as a substitution for the second printing apparatus 200C (refer to FIG. 10).

In a case where it is determined that an applied printing apparatus capable of being added does not exist (NO in step S106), a reciprocating path is provided in the route R to divide the allocation of the printing job, and the process returns to step S101.

Accordingly, in a case where the forward intersection is not present through appropriate repetition of steps S101, S102, and S104 to S108, the route R and allocation of the printing job which are changed are determined as final route R and allocation of the printing job.

Next, description will be given of an operation of the printing apparatus 200A that functions as a client.

Figure 14:
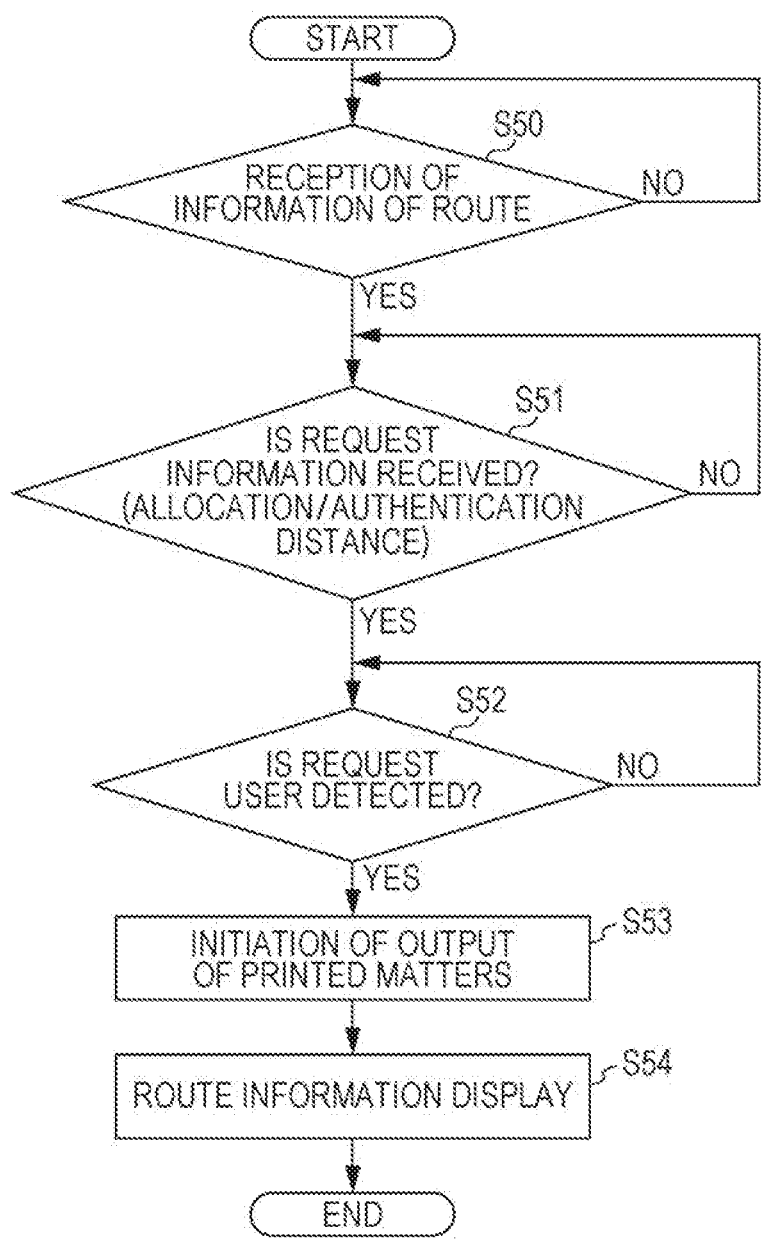
FIG. 14 is a flowchart illustrating an operation of a printing apparatus that functions as a client.

FIG. 14 is a flowchart illustrating an operation of a printing apparatus that functions as a client. Furthermore, an algorithm illustrated by the flowchart in FIG. 14 is stored as the second printing program 235, and is executed by the control unit 210 of the printing apparatus 200A.

As illustrated in FIG. 14, first, information of a route and request information, which are transmitted from the printing apparatus functioning as the server, are received (step S50 and step 351). Furthermore, the request information includes allocation of a printing job and an authentication distance. Then, it is determined whether or not entrance of the request user into an authentication range (a range of the authentication distance) is detected by using the mobile terminal 300 (step S52).

In a case where it is determined that entrance of the request user into the authentication range is detected (YES in step S52), output of printed matters corresponding to allocation of a printing job is initiated (step S53). In addition, information of a route is displayed on the display unit 284 of the operation panel 280 (step S54), and the process is terminated.

Next, Modification Examples 1 to 6 according to the embodiment of the invention will be sequentially described.

Figure 15:
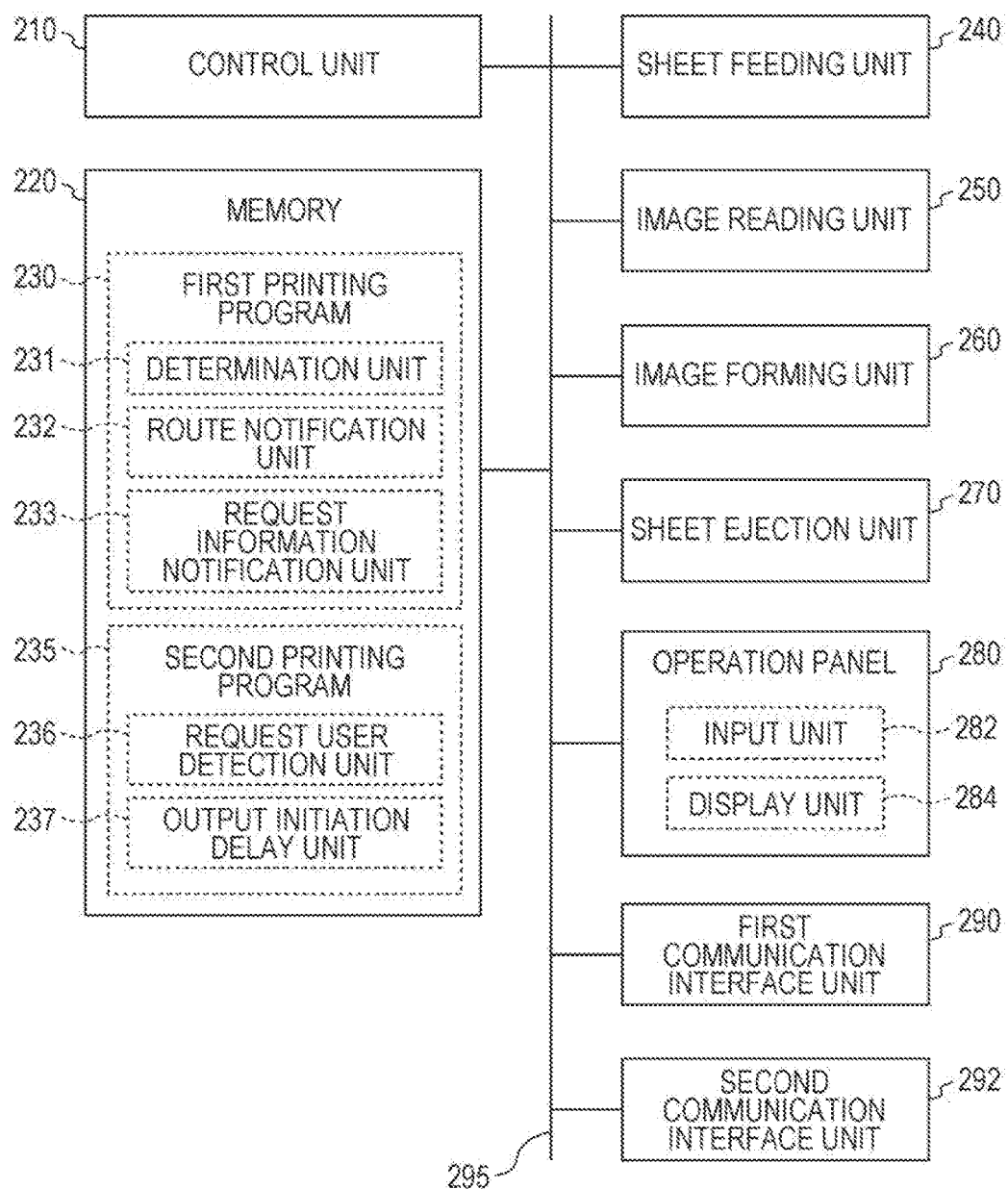
FIG. 15 is a block diagram illustrating Modification Example 1 according to the embodiment of the invention.
Figure 16:
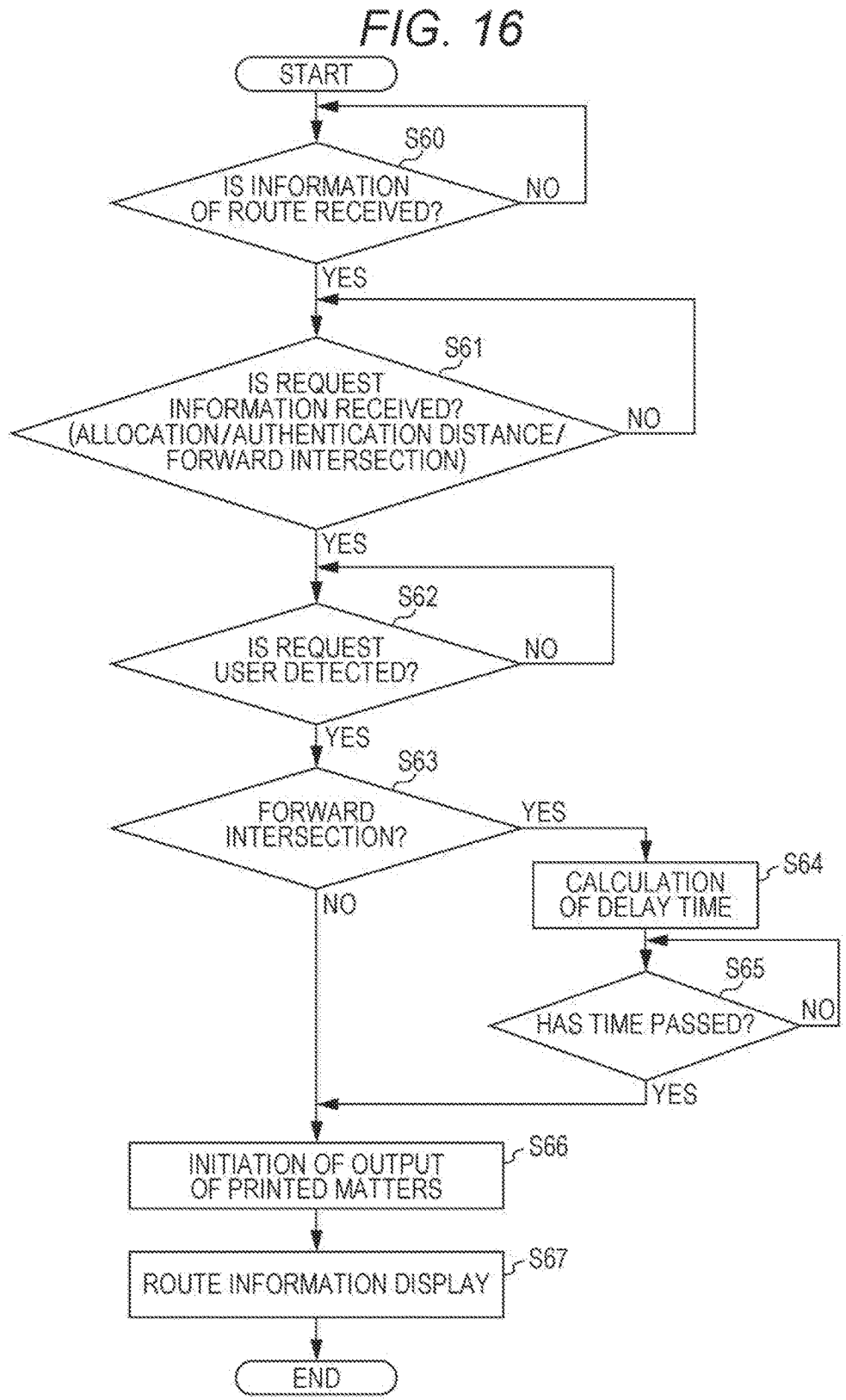
FIG. 16 is a flowchart illustrating Modification Example 1 according to the embodiment of the invention.

FIG. 15 and FIG. 16 are a block diagram and a flowchart illustrating Modification Example 1 according to the embodiment of the invention.

The forward intersection can be coped with by adjusting initiation timing of output of printed matters without limitation to the aspect of coping with the forward intersection by changing the route and/or allocation of the printing job.

For example, in an example illustrated in FIG. 15, the second printing program that exhibits the function as a client of the distribution processing further includes an output initiation delay unit 237.

When the forward intersection occurs, for example, in a case where the authentication range IA of the printing apparatus 200C overlaps the authentication range IA of the printing apparatus 200B, and intersects the route R toward the printing apparatus 200B (in a case where the printing apparatus 200B and the printing apparatus 200C are the first printing apparatus and the second printing apparatus), the output initiation delay unit 237 realizes a procedure of delaying initiation of output of printed matters in the second printing apparatus.

Delay time is a difference obtained by subtracting required time in a case where the request user walks over the authentication distance of the second printing apparatus 200C from walking time of the request user until reaching the second printing apparatus 200C from the first printing apparatus 200B through the forward intersection with reference to FIG. 8. Accordingly, output of printed matters in the second printing apparatus 200C is suppressed from being completed before the request user arrives at the second printing apparatus 200C similar to a case where the forward intersection is eliminated.

The delay time may be defined as a value obtained by dividing a difference, which is obtained by subtracting the authentication distance of the second printing apparatus 200C from a length of the route R until reaching the second printing apparatus 200C from the forward intersection through the first printing apparatus 200B, by a walking speed of the request user.

For example, a position of the forward intersection can be calculated on the basis of position information including distance data between the printing apparatuses 200A to 200G, information of the route, and the authentication distance of the second printing apparatus 200C. In addition, the distance (time) until reaching the forward intersection after entering the authentication range of the first printing apparatus 200B can be calculated in consideration of the authentication distance of the first printing apparatus 200B (and the walking speed of the request user) in addition to the above description.

Next, description will be given of an operation of the second printing apparatus 200C with reference to FIG. 16. Furthermore, in this case, the printing apparatus 200A that functions as the server transmits request information including information of the route and information of the forward intersection to the second printing apparatus 200C.

As illustrated in FIG. 16, first, when the request information including the information of the route and the information of the forward intersection is received (YES in step S60 and YES in step S61), it is determined whether or not entrance of the request user into the authentication range IA is detected (step S62).

In a case where it is determined that entrance of the request user into the authentication range is detected (YES in step S62), it is determined whether or not the forward intersection is present (step S63).

In a case where it is determined that the forward intersection is not present on the basis of the information of the forward intersection which is included in the request information (NO in step S63), the process proceeds to step S66.

In a case where it is determined that the forward intersection is present on the basis of the information of the forward intersection which is included in the request information (YES in step S63), the delay time is calculated (step S64). The delay time is a time period for which initiation of output of printed matters in the second printing apparatus 200C is delayed. Then, when the delay time has passed (YES in step S65), the process proceeds to step S66.

In step S66, output of printed matters corresponding to allocation of a printing job is initiated. In addition, information of the route is displayed on the display unit 284 of the operation panel 280 (step S67), and the process is terminated.

Next, description will be given of Modification Example 2 according to the embodiment of the invention.

Figure 17:
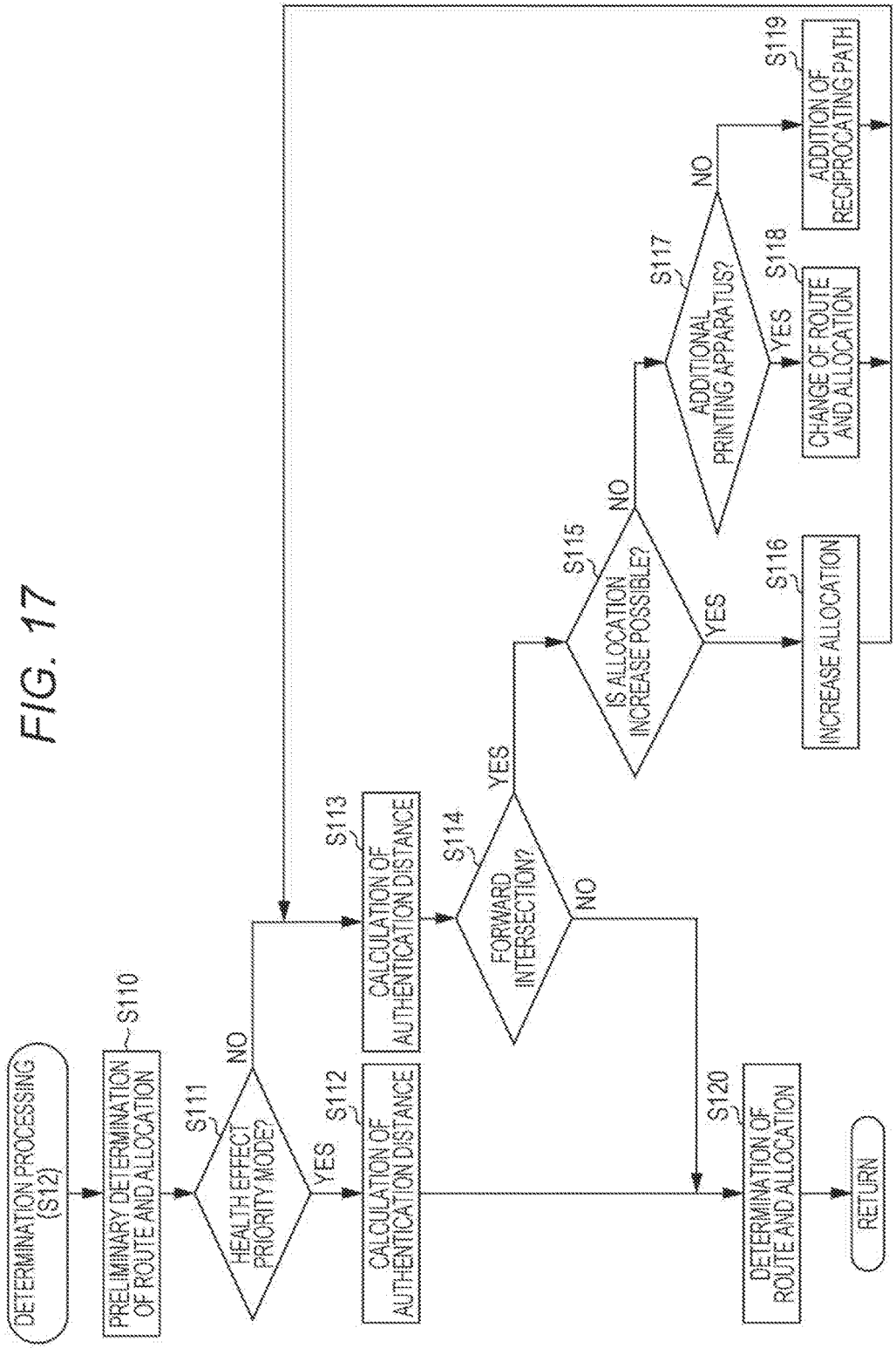
FIG. 17 is a flowchart illustrating an operation of a printing apparatus that functions as a server in Modification Example 2 according to the embodiment of the invention.
Figure 18:
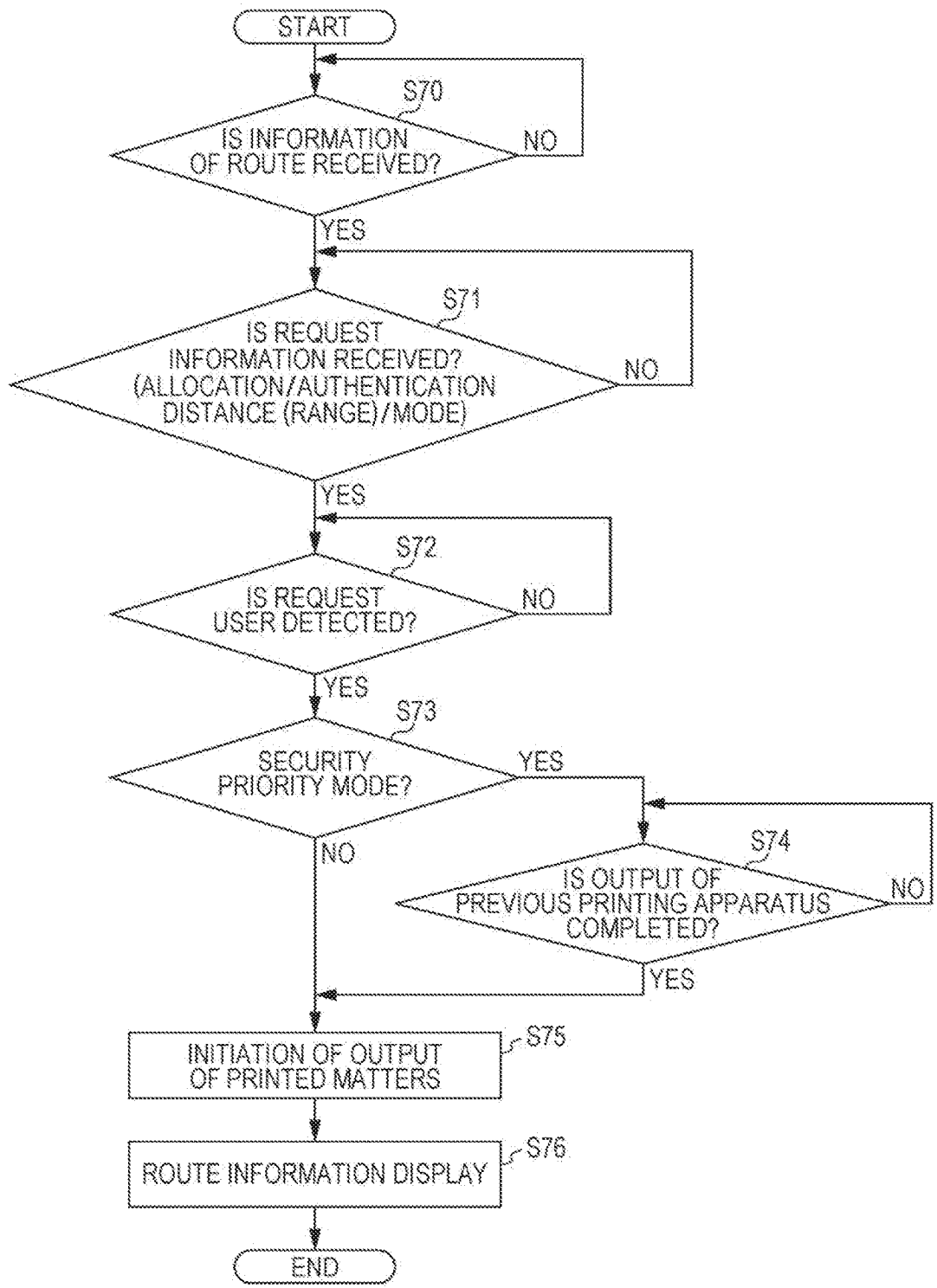
FIG. 18 is a flowchart illustrating an operation of a printing apparatus that functions as a client in Modification Example 2 according to the embodiment of the invention.

FIG. 17 is a flowchart illustrating an operation of a printing apparatus that functions as a server in Modification Example 2 according to the embodiment of the invention, and FIG. 18 is a flowchart illustrating an operation of a printing apparatus that functions as a client in Modification Example 2 according to the embodiment of the invention.

As a lower mode of the distribution processing mode, a health effect priority mode and a security priority mode may be provided. The health effect priority mode is a mode in which that exceptionally permits completion of output of printed matters before predetermined time at which the request user arrives. The security priority mode is a mode that exceptionally permits occurrence of user waiting time.

Next, description will be given of determination processing of the printing apparatus 200A that functions as a server in the health effect priority mode with reference to FIG. 17. Furthermore, in this case, the health effect priority mode is set (input) to the printing apparatus 200A.

As illustrated in FIG. 17, first, preliminary determination of the route R and allocation of the printing job is made (step S110). In addition, it is determined whether or not the health effect priority mode is set (step S111).

In a case where it is determined that the health effect priority mode is set (YES in step S111), the authentication distance (range) is calculated (step S112), the route R and the allocation of the printing job in the preliminary determination are determined as a final route R and allocation of the printing job (step S120), and the process is returned.

In a case where it is determined that the health effect priority mode is not set (YES in step S111), steps S113 to S119, in which consideration is made on whether or not the forward intersection is present, are executed. Steps S113 to S119 correspond to steps S101, S102, and S104 to S108 (refer to FIG. 13), and description thereof will not be repeated.

In a case where the health effect priority mode is set, as described above, consideration is not made on whether or not the forward intersection is present, and thus there is a concern that output of printed matters is completed before predetermined time at which the request user arrives, but occurrence of user waiting time is suppressed.

Next, description will be given of an operation of a second printing apparatus in a case where a first printing apparatus and the second printing apparatus exist among applied printing apparatuses, and the first printing apparatus is located upstream of the second printing apparatus in the route with reference to FIG. 18. In this embodiment, the first printing apparatus and the second printing apparatus are the printing apparatus 200B and the printing apparatus 200C which function as a client, and the printing apparatus 200A that functions as a server gives a notification of (transmits) request information including information of the security priority mode to the printing apparatus 200C.

As illustrated in FIG. 18, first, when the request information, which includes information of a route and information of the security priority mode, is received (YES in step S70 and YES in step S71), it is determined whether or not entrance of the request user into the authentication range of the second printing apparatus 200C is detected (step S72).

In a case where it is determined that entrance of the request user into the authentication range is detected (YES in step S72), it is determined whether or not the security priority mode is set (step S73).

In a case where it is determined that the security priority mode is not set (NO in step S73), the process proceeds to step S75.

In a case where it is determined that the security priority mode is set (YES in step S73), it is determined whether or not output of printed matters is completed in the first printing apparatus 200B (step S74). Completion of the output of the printed matters is detected through reception of status information of the first printing apparatus 200B through the network 900 by using, for example, a network management method SNMP.

In a case where it is determined that output of printed matters is completed in the first printing apparatus 200B (YES in step S74), the process proceeds to step S75.

In step S75, output of printed matters corresponding to allocation of a printing job of the second printing apparatus 200C is initiated. In addition, information of the route R is displayed on the display unit 284 of the operation panel 280 (step S76), and the process is terminated.

In the case of the security priority mode, as described above, output of printed matters is initiated after output of printed matters in the first printing apparatus 200B is completed, and thus there is a concern that user waiting time may occur. However, even in a case where the forward intersection is present, output of the printed matters is suppressed from being completed before predetermined time at which the request user arrives.

Next, description will be given of Modification Example 3 according to the embodiment of the invention.

Figure 19:
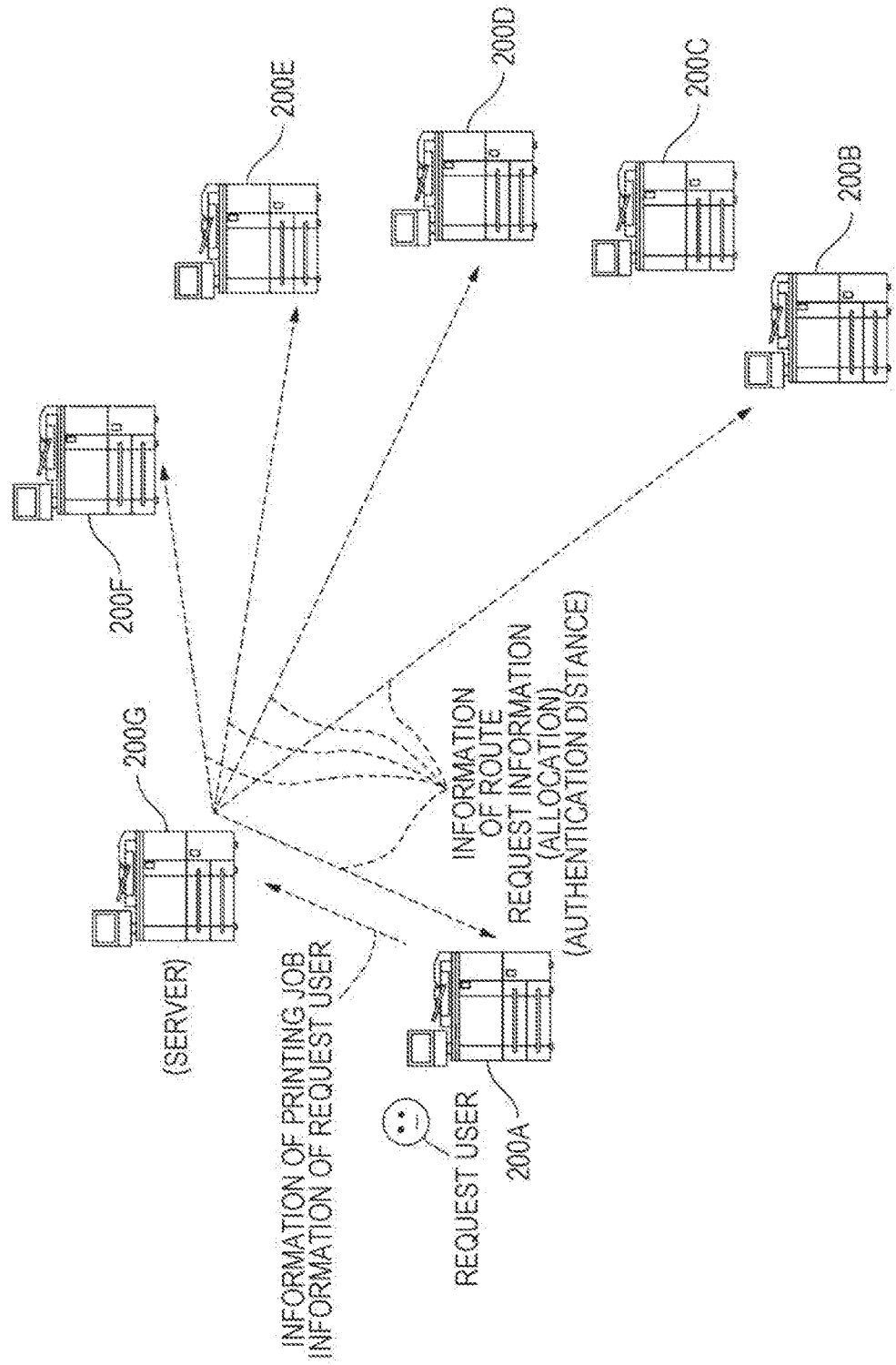
FIG. 19 is a schematic view illustrating Modification Example 3 according to the embodiment of the invention.
Figure 20:
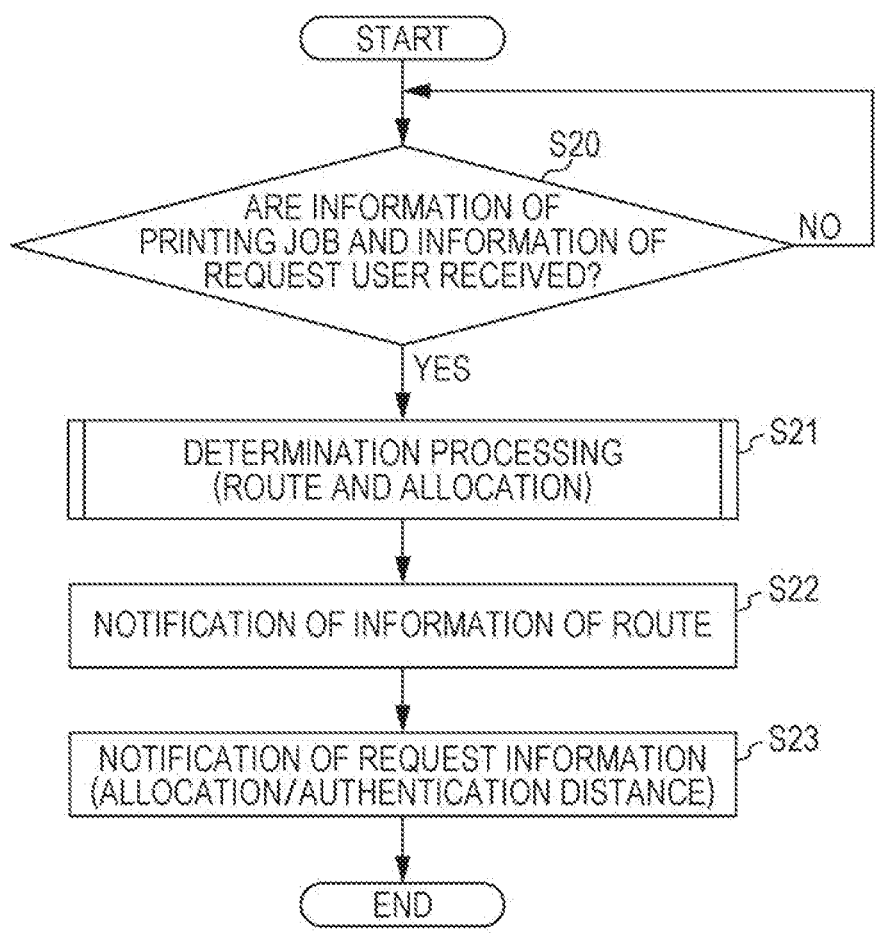
FIG. 20 is a flowchart illustrating an operation of a printing apparatus that functions as a server illustrated in FIG. 19.

FIG. 19 is a schematic view illustrating Modification Example 3 according to the embodiment of the invention, and FIG. 20 is a flowchart illustrating an operation of a printing apparatus that functions as a server illustrated in FIG. 19.

A printing apparatus functioning as a server that executes the first printing program 230 is not limited to the printing apparatus 200A that is requested to perform a printing job subjected to distribution processing, and it is possible to use additional printing apparatus 200G, which is spaced away from the printing apparatus 200A, as the server as illustrated in FIG. 19.

In this case, the printing apparatus 200A transmits information of a printing job and information of a request user to the printing apparatus 200G. In addition, as illustrated in FIG. 20, when receiving the information of the printing job and the information of the request user (YES in step S20), after executing the determination procedure, the printing apparatus 200G appropriately transmits a route and allocation of a printing job with respect to the printing apparatuses 200A, 200B, and 200D to 200F (steps S21 to S23). Steps S21 to S23 are approximately the same as steps S12 to S14 illustrated in FIG. 12, and thus description thereof will not be repeated.

Examples of the information of the request user include input values according to identification information, a walking distance, a walking speed, and the like of the request user. Furthermore, the printing apparatus that functions as the server is not limited to an aspect of being constituted by a printing apparatus (applied printing apparatus) that is located in the route.

Next, description will be given of Modification Example 4 according to the embodiment of the invention.

Figure 21:
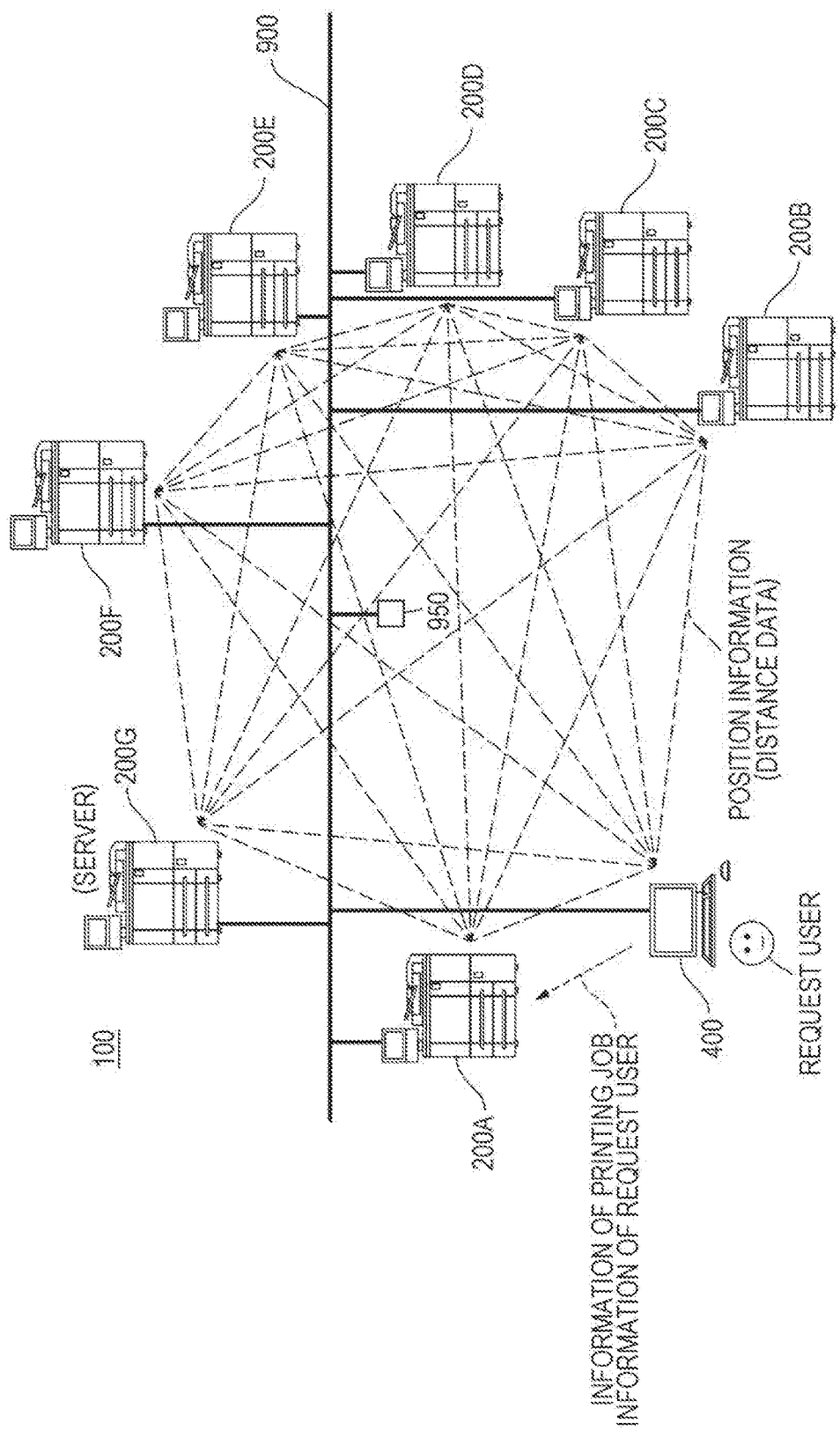
FIG. 21 is a schematic view illustrating Modification Example 4 according to the embodiment of the invention.

FIG. 21 is a schematic view illustrating Modification Example 4 according to the embodiment of the invention.

The printing system 100 is not limited to an aspect of being constituted by only the printing apparatuses 200A to 200G. For example, as illustrated in FIG. 21, the printing system 100 may include a computer 400 that is used by a request user. In this case, a start position of the request user is an installed position of the computer 400 (a seat position of the request user), and thus position information that is used when selecting a route include distance data between the computer 400 and the printing apparatuses 200A to 200G. In addition, the computer 400 transmits information of a printing job and information of the request user to the printing apparatus 200A that functions as a server.

On the other hand, as is a case with Modification Example 3 (refer to FIG. 20), the printing apparatus 200A that functions as a server receives the information of the printing job and the information of the request user, and appropriately transmits a route and allocation of the printing job to the printing apparatuses 200B, and 200D to 200G.

Next, description will be given of Modification Example 5 according to the embodiment of the invention.

Figure 22:
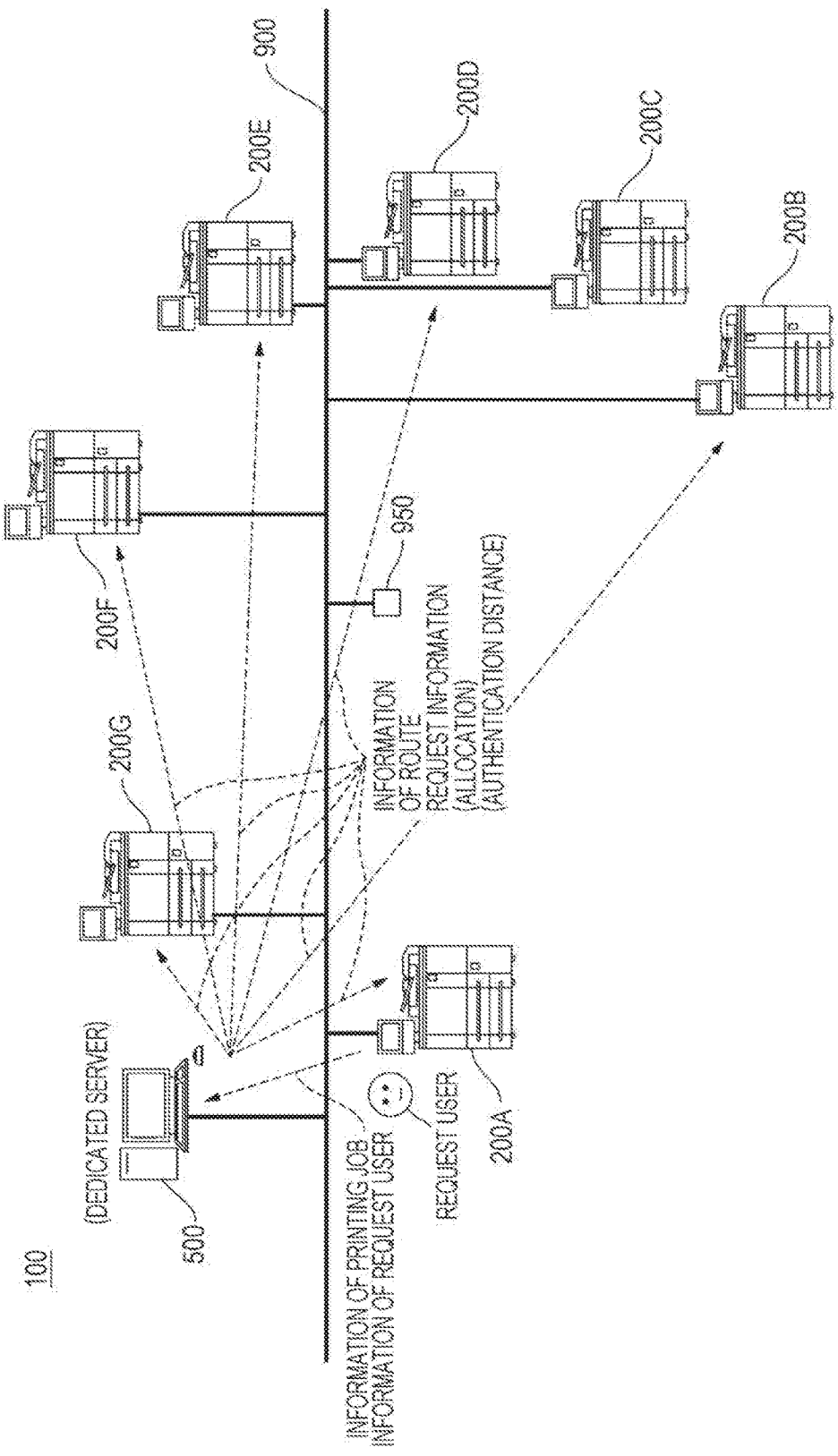
FIG. 22 is a schematic view illustrating Modification Example 5 according to the embodiment of the invention.
Figure 23:
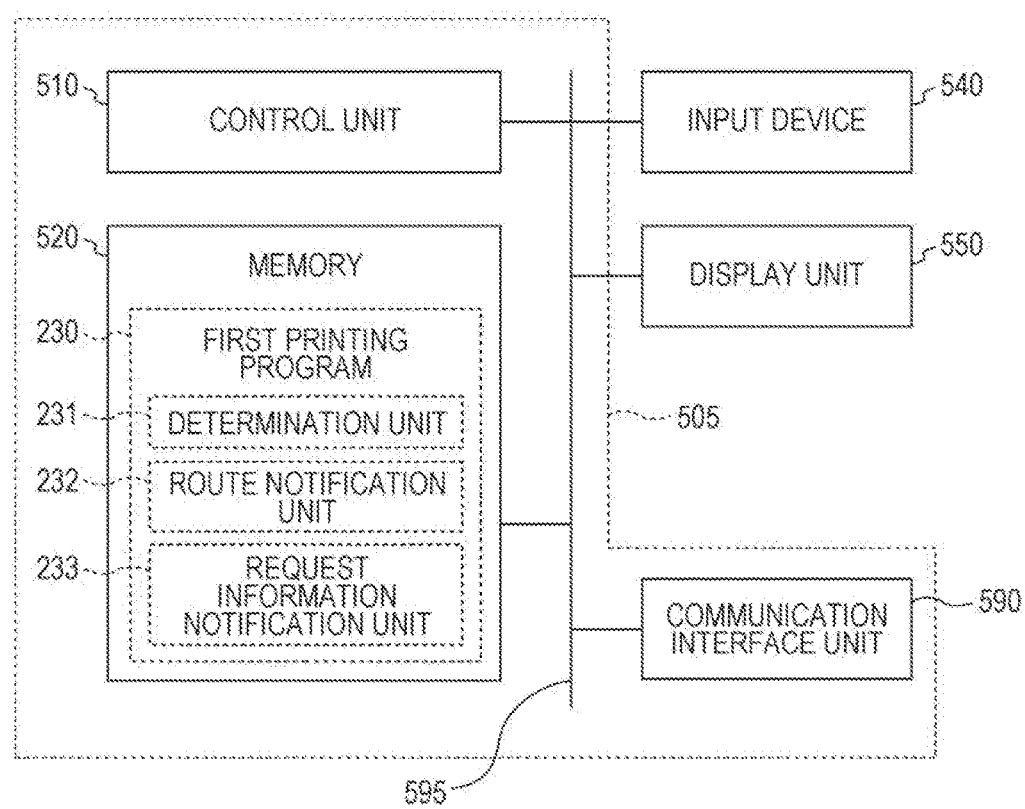
FIG. 23 is a block diagram illustrating a configuration of a server that is illustrated in FIG. 22.

FIG. 22 is a schematic view illustrating Modification Example 5 according to the embodiment of the invention, and FIG. 23 is a block diagram illustrating a configuration of a server illustrated in FIG. 22.

A server that manages the printing system 100 is not limited to an aspect of using the printing apparatuses 200A to 200G (allowing the printing apparatuses 200A to 200G to also function as a server). For example, a dedicated server 500 may be provided as illustrated in FIG. 22.

For example, as illustrated in FIG. 23, the server 500 includes a main body 505, an input device 540, and a display unit 350. The main body 505 includes a control unit 510, a memory 520, and a communication interface 590, and these components are connected to each other through a bus 595.

The control unit 510 is a control circuit that is constituted by a microprocessor that performs a control of respective units or various kinds of arithmetic processing according to a program, and the like, and respective functions of the server 500 is exhibited when the control unit 510 executes programs corresponding to the respective functions.

The memory 520 is constituted by appropriately combining a high-speed random access storage device that temporarily stores a program and data as a working region, a large-capacity random access storage device that retains various processing programs or various pieces of data, and the like.

Examples of the program that is stored include an operating system (OS), application software, and the first printing program 230. Examples of the data that is stored include position information (referred to FIG. 3) that includes distance data between the printing apparatuses 200A to 200G, information of a route, setting data, printing job data that is transmitted from the communication interface 590, and the like.

The input device 540 includes a keyboard and a pointing device such as a mouse, and is used to perform various kinds of input.

For example, the display unit 350 is a liquid crystal display (LCD) or a cathode ray tube (CRT) display, and is used to display various pieces of information.

The communication interface 590 is a communication unit (LAN board) that is constituted by an extension device that adds a communication function through the network 900, and is used to perform transmission and reception of data to and from the printing apparatuses 200A to 200G which pertain to the network 900.

Furthermore, as is a case with Modification Example 3 (refer to FIG. 20), the server 500 receives information of a printing job and information of a request user from the printing apparatus 200A that is requested to perform the printing job subjected to distribution processing, and executes determination processing. Then, the server 500 approximately transmits a route and allocation of the printing job to the printing apparatuses 200A, 200B, and 200D to 200F.

Next, description will be given of Modification Example 6 according to the embodiment of the invention.

FIG. 24 is a schematic view illustrating Modification Example 6 according to the embodiment of the invention.

For example, notification of information of the route and the like may be given by using the display unit 350 of the mobile terminal 300 that is carried by the request user as illustrated in FIG. 24 without limitation to an aspect of using the display unit 284 of the operation panel 280 of the printing apparatuses 200A to 200G. In this case, the route notification unit 232 notifies the mobile terminal 300 of an instruction for displaying information of the route on the display unit 284.

As described above, in this embodiment, allocation of a printing job is determined so that user waiting time does not occur. Accordingly, when sequentially acquiring printed matters, it is necessary for the request user to continuously walk without an interval, and thus it is possible to expect a walking effect and it is possible to efficiently achieve user's health promotion (increase in the number of walking steps). In addition, when it is detected that the request user enters the authentication range, printing of printed matters corresponding to allocation of the printing job is initiated, and thus information leakage is suppressed. Accordingly, it is possible to provide a printing system and a printing program which efficiently achieve health promotion (increase in the number of walking steps) of a user and secure security.

Furthermore, for example, specification of the request user can be performed by using non-contact type biometric authentication without limitation to an aspect of using the authentication information of the mobile terminal 300 that is carried by the request user. Examples of the non-contact type biometric authentication include authentication by a face feature amount (face shape) or the iris of the request user which is detected by using a camera, and the like.

For example, a position of the request user may be directly detected by a distance sensor using an ultrasonic wave or a laser without limitation to an aspect of detecting the position on the basis of wireless intensity (electric wave intensity attenuation based on a distance) from the mobile terminal 300.

It is preferable to provide a simplified setting mode as a lower mode of the distribution processing mode so as to simplify input of setting data that is used for determination of the route and change of the route, and so as to meet various demands of the request user. For example, the simplified setting mode may include a muscle strength increasing mode, a walking step increasing mode, a health information mode, a low load mode, a time management mode, and the like.

In the muscle strength increasing mode, a candidate printing apparatus, which is provided at a separate floor, is preferentially extracted as an applied printing apparatus in order for the request user uses steps, or a setting value of a walking speed of the request user is increased (is made to be faster). In the walking step increasing mode, a walking distance is increased (becomes a long distance). In the health information mode, a setting value corresponding to health information (for example, a health diagnosis result, the amount of movement (the number of walking steps and the like)) of the request user is automatically input. For example, the low load mode corresponds to a case where the request user is tired. In the low load mode, the walking distance or the walking speed of the request user is reduced, or a candidate printing apparatus, which is provided at the same floor, is preferentially extracted as an applied printing apparatus. In the time management mode, desired termination time is designated.

Time until arriving at a printing apparatus, which is a next destination, may be displayed on the display unit 284 of the operation panel 280 to attract attention so as to control a movement speed of the request user.

In the notification of the information of the route and the like, a printed matter (for example, a map on which a route is drawn, and the like), which is output, may be used.

The invention is not limited to the above-described embodiment, and various modifications can be made in the scope of the attached claims. For example, it is possible to appropriately combine Modification Example 1 and Modification Example 2 with Modification Example 3 to Modification Example 6.

Furthermore, a printing program according to the present invention can also be realized a dedicated hardware circuit. In addition, in the case of realizing the invention by the printing program, the program may be provided by a computer-readable recording medium such as a universal serial bus (USB) memory and a digital versatile disc (DVD)-read only memory (ROM), or may be provided on-line through a network such as the Internet without using the recording medium. In this case, typically, the printing program is transmitted to a storage device such as a magnetic disk device that constitutes a memory and is stored in the storage device. In addition, the program may be provided as single application software, or may be provided in a state of being embedded in additional software as one function.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A server that manages a printing system including a plurality of candidate printing apparatuses connected to a network, the printing system including a request user detection unit configured to detect that a request user of a printing job, which is subjected to distribution processing, enters a range of an authentication distance according to the plurality of candidate printing apparatuses, and the printing system causing a hardware processor of the server to execute:

a determination procedure of selecting a route that connects a plurality of applied printing apparatuses which are extracted from the plurality of candidate printing apparatuses on the basis of a walking distance and a walking speed which are set to the request user in advance, position information including distance data, which is stored in a memory in advance, between the plurality of candidate printing apparatuses, the authentication distance, and specifications including a printing speed in the plurality of candidate printing apparatus, and of determining allocation of the printing job that is executed in the plurality of applied printing apparatuses;

a route notification procedure of notifying the request user of information of the route; and a request information notification procedure of notifying the plurality of applied printing apparatuses of request information including the allocation, wherein, in the determination procedure, the allocation is determined on the basis of predetermined time at which the request user arrives so that when the request user moves along the route and sequentially acquires printed matters corresponding to the allocation, user waiting time until completion of output of the printed matters does not occur in each of the applied printing apparatus at which the request user arrives, and the plurality of applied printing apparatuses initiate output of the printed matters corresponding to the allocation in a case where it is detected that the request user enters a range of the authentication distance, and wherein the authentication distance corresponds to required time taken from initiation to completion of output of the printed matters corresponding to the allocation.

2. The server according to claim 1, wherein the authentication distance is calculated by multiplying the required time taken from initiation to completion of output of the printed matters corresponding to the allocation by the walking speed of the request user.

3. The server according to claim 1, wherein in a case where a first printing apparatus and a second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, the determination unit adjusts the allocation of the plurality of applied printing apparatuses so that the allocation of the first printing apparatus increases.

4. The server according to claim 1, wherein in a case where a first printing apparatus and a second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, the determination unit extracts an additional third printing apparatus from the plurality of candidate printing apparatuses excluding the plurality of applied printing apparatuses, and changes the route of the plurality of applied printing apparatuses including the third printing apparatus and the allocation so that a route toward the first printing apparatus and a range of the authentication distance of the second printing apparatus do not intersect each other.

5. The server according to claim 1, wherein in a case where a first printing apparatus and a second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, the determination unit extracts a third printing apparatus, which is substituted for the second printing apparatus, from the plurality of candidate printing apparatuses excluding the plurality of applied printing apparatuses, and determines the route of the plurality of applied printing apparatuses including the third printing apparatus and excluding the second printing apparatus and the allocation so that a route toward the first printing apparatus and a range of the authentication distance of the third printing apparatus do not intersect each other.

6. The server according to claim 1, wherein the printing system further includes an output initiation delay unit that delays initiation of output of the printed matters in a second printing apparatus in a case where a first printing apparatus and the second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, and delay time is a difference obtained by subtracting required time in a case where the request user walks over the authentication distance of the second printing apparatus from walking time of the request user until arriving at the second printing apparatus through the first printing apparatus from a point at which a route toward the first printing apparatus and a range of the authentication distance of the second printing apparatus intersect each other.

7. The server according to claim 1,
wherein the determination unit includes a health effect priority mode in which output of the printed matters is permitted to be completed before predetermined time at which the request user arrives, and a security priority mode in which occurrence of the user waiting time is permitted.

8. The server according to claim 7,
wherein in a case where a first printing apparatus and a second printing apparatus exist among the plurality of applied printing apparatuses, and the first printing apparatus is located upstream of the second printing apparatus in the route, in the security priority mode,
the second printing apparatus initiates output of the printed matters after output of the printed matters in the first printing apparatus is completed.

9. The server according to claim 1,
wherein the determination unit includes a plurality of modes for health promotion of the request user, and changes at least one of the walking distance and the walking speed for each of the modes.

10. The server according to claim 9,
wherein the plurality of modes include at least one of a muscle strength increasing mode of further enlarging a setting value of the walking speed of the request user, and a walking step increasing mode of further enlarging a setting value of the walking distance.

11. The server according to claim 1,
wherein the plurality of candidate printing apparatuses include a display device that displays information, and
the route notification unit displays information of the route on the display device.

12. The server according to claim 1,
wherein the printing system further includes a mobile terminal that is capable of performing a wireless communication with the plurality of candidate printing apparatuses, and has authentication information of the request user,
the plurality of candidate printing apparatuses include the request user detection unit, and
the request user detection unit authenticates a user who carries the mobile terminal as the request user in accordance with the authentication information, and detects that the request user enters a range of the authentication distance on the basis of wireless intensity.

13. The server according to claim 10,
wherein the mobile terminal includes a display device that displays information, and
the route notification unit displays information of the route on the display device of the mobile terminal.

14. The server according to claim 1,
wherein the printing system further includes a computer that is connected to the network and is used by the request user, and
the position information includes distance data between the computer and the plurality of candidate printing apparatuses.

15. The server according to claim 1,
wherein the printing system further includes a server that is connected to the network and manages the plurality of candidate printing apparatuses, and
the server includes at least the memory, the determination unit, the route notification unit, and the request information notification unit.

16. The server according to claim 13,
wherein the server is constituted by one of the plurality of candidate printing apparatuses including the plurality of applied printing apparatuses.

17. A non-transitory recording medium storing a computer readable printing program executed by a server that manages a printing system including a plurality of candidate printing apparatuses connected to a network,
the printing system including a request user detection unit configured to detect that a request user of a printing job, which is subjected to distribution processing, enters a range of an authentication distance according to the plurality of candidate printing apparatuses, and
the printing program causing a hardware processor of the server to execute:
a determination procedure of selecting a route that connects a plurality of applied printing apparatuses which are extracted from the plurality of candidate printing apparatuses on the basis of a walking distance and a walking speed which are set to the request user in advance, position information including distance data, which is stored in a memory in advance, between the plurality of candidate printing apparatuses, the authentication distance, and specifications including a printing speed in the plurality of candidate printing apparatus, and of determining allocation of the printing job that is executed in the plurality of applied printing apparatuses;
a route notification procedure of notifying the request user of information of the route; and
a request information notification procedure of notifying the plurality of applied printing apparatuses of request information including the allocation,
wherein, in the determination procedure, the allocation is determined on the basis of predetermined time at which the request user arrives so that when the request user moves along the route and sequentially acquires printed matters corresponding to the allocation, user waiting time until completion of output of the printed matters does not occur in each of the applied printing apparatus at which the request user arrives, and
the plurality of applied printing apparatuses are configured to initiate output of the printed matters corresponding to the allocation in a case where it is detected that the request user enters a range of the authentication distance, and wherein the authentication distance corresponds to required time taken from initiation to completion of output of the printed matters corresponding to the allocation.

18. The non-transitory recording medium storing a computer readable printing program according to claim 17, wherein the authentication distance is calculated by multiplying the required time taken from initiation to completion of output of the printed matters corresponding to the allocation by the walking speed of the request user.

19. The non-transitory recording medium storing a computer readable printing program according to claim 17, wherein in a case where a first printing apparatus and a second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, in the determination procedure, the allocation of the plurality of applied printing apparatuses is adjusted so that the allocation of the first printing apparatus increases.

20. The non-transitory recording medium storing a computer readable printing program according to claim 17, wherein in a case where a first printing apparatus and a second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, in the determination procedure, an additional third printing apparatus is extracted from the plurality of candidate printing apparatuses excluding the plurality of applied printing apparatuses, and the route of the plurality of applied printing apparatuses including the third printing apparatus and the allocation are changed so that a route toward the first printing apparatus and a range of the authentication distance of the second printing apparatus do not intersect each other.

21. The non-transitory recording medium storing a computer readable printing program according to claim 17, wherein in a case where a first printing apparatus and a second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, in the determination procedure, a third printing apparatus, which is substituted for the second printing apparatus, is extracted from the plurality of candidate printing apparatuses excluding the plurality of applied printing apparatuses, and the route of the plurality of applied printing apparatuses including the third printing apparatus and excluding the second printing apparatus and the allocation are determined so that a route toward the first printing apparatus and a range of the authentication distance of the third printing apparatus do not intersect each other.

22. The non-transitory recording medium storing a computer readable printing program according to claim 17, wherein in a case where a first printing apparatus and the second printing apparatus, of which ranges of the authentication distance overlap each other, exist among the plurality of applied printing apparatuses, the first printing apparatus is located upstream of the second printing apparatus in the route, and a route toward the first printing apparatus and the range of the authentication distance of the second printing apparatus intersect each other, in the request information notification procedure,
the second printing apparatus is notified of the request information including information of the intersection,
the second printing apparatus includes an output initiation delay unit that delays initiation of output of the printed matters in the case of receiving information of the intersection, and
delay time is a difference obtained by subtracting required time in a case where the request user walks over the authentication distance of the second printing apparatus from walking time of the request user until arriving at the second printing apparatus through the first printing apparatus from a point at which a route toward the first printing apparatus and a range of the authentication distance of the second printing apparatus intersect each other.

23. The non-transitory recording medium storing a computer readable printing program according to claim 17, wherein the determination procedure includes a health effect priority mode that exceptionally permits completion of output of the printed matters before predetermined time at which the request user arrives, and a security priority mode that exceptionally permits occurrence of the user waiting time.

24. The non-transitory recording medium storing a computer readable printing program according to claim 21, wherein in the security priority mode, in a case where a first printing apparatus and a second printing apparatus exist among the plurality of applied printing apparatuses, and the first printing apparatus is located upstream of the second printing apparatus in the route, in the request information notification procedure, the second printing apparatus is notified of the request information including setting of the security priority mode, and
the second printing apparatus initiates output of the printed matters after output of the printed matters in the first printing apparatus is completed.

25. The non-transitory recording medium storing a computer readable printing program according to claim 17, wherein the determination procedure includes a plurality of modes for health promotion of the request user, and at least one of the walking distance and the walking speed is changed for each of the modes.

26. The non-transitory recording medium storing a computer readable printing program according to claim 25, wherein the plurality of modes include at least one of a muscle strength increasing mode of further enlarging a setting value of the walking speed of the request user, and a walking step increasing mode of further enlarging a setting value of the walking distance.

27. The non-transitory recording medium storing a computer readable printing program according to claim 17, wherein the plurality of candidate printing apparatuses include a display device that displays information, and in the route notification procedure, the plurality of candidate printing apparatuses are notified of an instruction for displaying information of the route on the display device.

28. The non-transitory recording medium storing a computer readable printing program according to claim 17,
wherein the printing system further includes a mobile terminal that is capable of performing a wireless communication with the plurality of candidate printing apparatuses, and has authentication information of the request user,
the plurality of candidate printing apparatuses include the request user detection unit, and
the request user detection unit authenticates a user who carries the mobile terminal as the request user in accordance with the authentication information, and detects that the request user enters a range of the authentication distance on the basis of wireless intensity.

29. The non-transitory recording medium storing a computer readable printing program according to claim 24,
wherein the mobile terminal includes a display device that displays information, and
in the route notification procedure, the mobile terminal is notified of an instruction for displaying information of the route on the display device of the mobile terminal.

30. The non-transitory recording medium storing a computer readable printing program according to claim 17,
wherein the printing system further includes a computer that is connected to the network and is used by the request user, and
the position information includes distance data between the computer and the plurality of candidate printing apparatuses.

31. The non-transitory recording medium storing a computer readable printing program according to claim 17,
wherein the server is constituted by one of the plurality of candidate printing apparatuses including the plurality of applied printing apparatuses.

32. A printing system comprising:
a plurality of candidate printing apparatuses connected to a network;
a memory configured to store position information including distance data between the plurality of candidate printing apparatuses;
a request user detection unit configured to detects that a request user of a printing job, which is subjected to distribution processing, enters a range of an authentication distance according to the plurality of candidate printing apparatuses;
a determination unit configured to select a route that connects a plurality of applied printing apparatuses which are extracted from the plurality of candidate printing apparatuses on the basis of a walking distance and a walking speed which are set to the request user in advance, the position information, the authentication distance, and specifications including a printing speed in the plurality of candidate printing apparatus, and to determine allocation of the printing job that is executed in the plurality of applied printing apparatuses;
a route notification unit that notifies the request user of information of the route; and
a request information notification unit that notifies the plurality of applied printing apparatuses of request information including the allocation,
wherein the determination unit determines the allocation on the basis of predetermined time at which the request user arrives so that when the request user moves along the route and sequentially acquires printed matters corresponding to the allocation, user waiting time until completion of output of the printed matters does not occur in each of the applied printing apparatus at which the request user arrives,
the plurality of applied printing apparatuses are configured to initiate output of the printed matters corresponding to the allocation in a case where it is detected that the request user enters a range of the authentication distance, and
the authentication distance corresponds to required time taken from initiation to completion of output of the printed matters corresponding to the allocation.

* * * * *